United States Patent
Lee et al.

(10) Patent No.: US 12,255,716 B2
(45) Date of Patent: Mar. 18, 2025

(54) METHOD AND APPARATUS FOR MODULAR MASSIVE MIMO

(71) Applicant: Samsung Electronics Co., Ltd., Suwon-si (KR)

(72) Inventors: Gilwon Lee, McKinney, TX (US); Md. Saifur Rahman, Plano, TX (US); Jeongho Jeon, San Jose, CA (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 17/813,315

(22) Filed: Jul. 18, 2022

(65) Prior Publication Data

US 2023/0056240 A1    Feb. 23, 2023

Related U.S. Application Data

(60) Provisional application No. 63/244,505, filed on Sep. 15, 2021, provisional application No. 63/227,187, filed on Jul. 29, 2021.

(51) Int. Cl.
| | |
|---|---|
| *H04L 1/02* | (2006.01) |
| *H04B 7/0452* | (2017.01) |
| *H04B 7/0456* | (2017.01) |
| *H04B 7/06* | (2006.01) |

(52) U.S. Cl.
CPC ......... *H04B 7/0626* (2013.01); *H04B 7/0452* (2013.01); *H04B 7/0456* (2013.01)

(58) Field of Classification Search
CPC ... H04B 7/0456; H04B 17/364; H04L 1/0026; H04L 1/0027; H04L 5/006; H04W 52/242; H04W 72/04

USPC .......................... 375/267, 260, 262
See application file for complete search history.

(56) References Cited

U.S. PATENT DOCUMENTS

| | | | |
|---|---|---|---|
| 10,349,289 B2 * | 7/2019 | Auer | H04W 24/02 |
| 2012/0269278 A1 * | 10/2012 | Onggosanusi | H04B 7/024 |
| | | | 375/267 |
| 2013/0039349 A1 | 2/2013 | Ebrahimi Tazeh Mahalleh et al. | |
| 2014/0064201 A1 | 3/2014 | Zhu et al. | |

(Continued)

FOREIGN PATENT DOCUMENTS

WO    2012144866 A2    10/2012

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

(Continued)

*Primary Examiner* — Khai Tran

(57) ABSTRACT

A method for operating a user equipment (UE) comprises receiving configuration information about a channel state information (CSI) report, the configuration information including a number of radio remote heads (RRHs), $N_{RRH} > 1$; selecting a subset of RRHs from the $N_{RRH}$ RRHs independently for each subband (SB); determining the CSI report including an indicator indicating the selected subset of RRHs for each SB; and transmitting the CSI report including the indicator indicating the selected subset of RRHs for each SB.

20 Claims, 18 Drawing Sheets

(56) References Cited

U.S. PATENT DOCUMENTS

| | | | |
|---|---|---|---|
| 2014/0086187 A1 | 3/2014 | Kang et al. | |
| 2014/0141832 A1* | 5/2014 | Liang | H04W 52/242 |
| | | | 455/522 |
| 2014/0227987 A1 | 8/2014 | Seo et al. | |
| 2015/0146676 A1 | 5/2015 | Onggosanusi et al. | |
| 2016/0134402 A1* | 5/2016 | Park | H04L 27/2663 |
| | | | 370/329 |
| 2019/0007954 A1* | 1/2019 | Mach | H04W 72/04 |
| 2020/0328862 A1 | 10/2020 | Rahman et al. | |
| 2021/0126675 A1* | 4/2021 | Lin | H04B 7/024 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer procedures for control (Release 17)", 3GPP TS 38.213 V17.0.0, Dec. 2021, 225 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer measurements (Release 17)", 3GPP TS 38.215 V17.0.0, Dec. 2021, 26 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"5G; NG-RAN; F1 Application Protocol (F1AP) (3GPP TS 38.473 version 16.4.0 Release 16)", ETSI TS 138 473 V16.4.0, Jan. 2021, 465 pages.

International Search Report and Written Opinion issued Nov. 3, 2022 regarding International Application No. PCT/KR2022/011133, 10 pages.

Extended European Search Report issued Aug. 21, 2024 regarding Application No. 22849904.2, 7 pages.

\* cited by examiner

METHOD AND APPARATUS FOR MODULAR MASSIVE MIMO

CROSS-REFERENCE TO RELATED APPLICATIONS AND CLAIM OF PRIORITY

The present application claims priority to U.S. Provisional Patent Application No. 63/227,187, filed on Jul. 29, 2021, and U.S. Provisional Patent Application No. 63/244,505, filed on Sep. 15, 2021. The content of the above-identified patent documents is incorporated herein by reference.

TECHNICAL FIELD

The present disclosure relates generally to wireless communication systems and more specifically to methods and apparatus for modular massive MIMO.

BACKGROUND

For a cellular system operating in a sub-1 GHz frequency range (e.g. less than 1 GHz), supporting a large number of CSI-RS antenna ports (e.g. 32) at a single location or remote radio head (RRH) is challenging due to the fact that a larger antenna form factor size is needed at these frequencies than a system operating at a higher frequency such as 2 GHz or 4 GHz. At such low frequencies, the maximum number of CSI-RS antenna ports that can be co-located at a single site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple locations (or panels/RRHs). The multiple sites or panels/RRHs can still be connected to a single (common) base unit, hence the signal transmitted/received via multiple distributed RRHs can still be processed at a centralized location.

SUMMARY

Embodiments of the present disclosure provide methods and apparatuses for modular MIMO, distributed MIMO, or multi-TRP MIMO in a wireless communication system.

In one embodiment, a UE in a wireless communication system is provided. The UE includes a transceiver configured to receive configuration information about a channel state information (CSI) report, the configuration information including a number of radio remote heads (RRHs), $N_{RRH}>1$. The UE further includes a processor operably coupled to the transceiver. The processor is configured, based on the configuration information, to: select a subset of RRHs from the $N_{RRH}$ RRHs independently for each subband (SB), and determine the CSI report including an indicator indicating the selected subset of RRHs for each SB. The transceiver is further configured to transmit the CSI report including the indicator indicating the selected subset of RRHs for each SB.

In another embodiment, a BS in a wireless communication system is provided. The BS includes a processor configured to generate configuration information about a CSI report, the configuration information including a number of RRHs, $N_{RRH}>1$. The BS further includes a transceiver operably coupled to the processor. The transceiver is configured to: transmit the configuration information; and receive the CSI report including an indicator indicating a selected subset of RRHs for each SB; wherein the subset of RRHs is selected from the $N_{RRH}$ RRHs independently for each subband (SB).

In yet another embodiment, a method for operating a UE is provided. The method comprises: receiving configuration information about a CSI report, the configuration information including a number of RRHs, $N_{RRH}>1$; selecting a subset of RRHs from the $N_{RRH}$ RRHs independently for each SB; determining the CSI report including an indicator indicating the selected subset of RRHs for each SB; and transmitting the CSI report including the indicator indicating the selected subset of RRHs for each SB.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
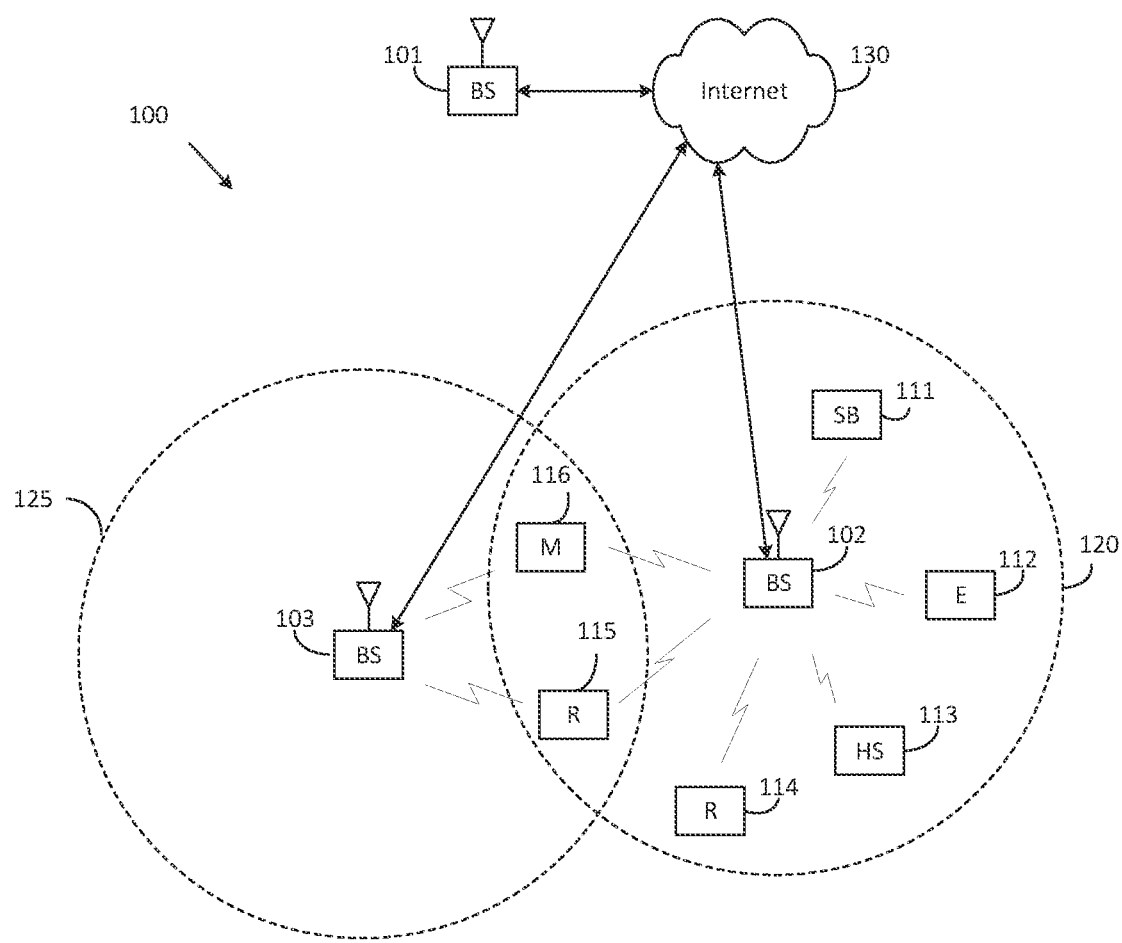
FIG. 1 illustrates an example wireless network according to embodiments of the present disclosure.

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v v17.0.0, "E-UTRA, Physical Layer Procedures" (herein "REF 3"); 3GPP TS 36.321 v v17.0.0, "E-UTRA, Medium Access Control (MAC) protocol specification" (herein "REF 4"); 3GPP TS 36.331 v v17.0.0, "E-UTRA, Radio Resource Control (RRC) protocol specification" (herein "REF 5"); 3GPP TS 38.211 v v17.0.0, "NR, Physical channels and modulation" (herein "REF 6"); 3GPP TS 38.212 v v17.0.0, "E-UTRA, NR, Multiplexing and channel coding" (herein "REF 7"); 3GPP TS 38.213 v17.0.0, "NR, Physical Layer Procedures for Control" (herein "REF 8"); 3GPP TS 38.214 v17.0.0; "NR, Physical Layer Procedures for Data" (herein "REF 9"); 3GPP TS 38.215 v17.0.0, "NR, Physical Layer Measurements" (herein "REF 10"); 3GPP TS 38.321 v17.0.0, "NR, Medium Access Control (MAC) protocol specification" (herein "REF 11"); 3GPP TS 38.331 v17.0.0, "NR, Radio Resource Control (RRC) Protocol Specification" (herein "REF 12") and 3GPP TS 38.473 v16.4.0, "NG-RAN; F1 Application Protocol (FLAP) (herein "REF 13").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
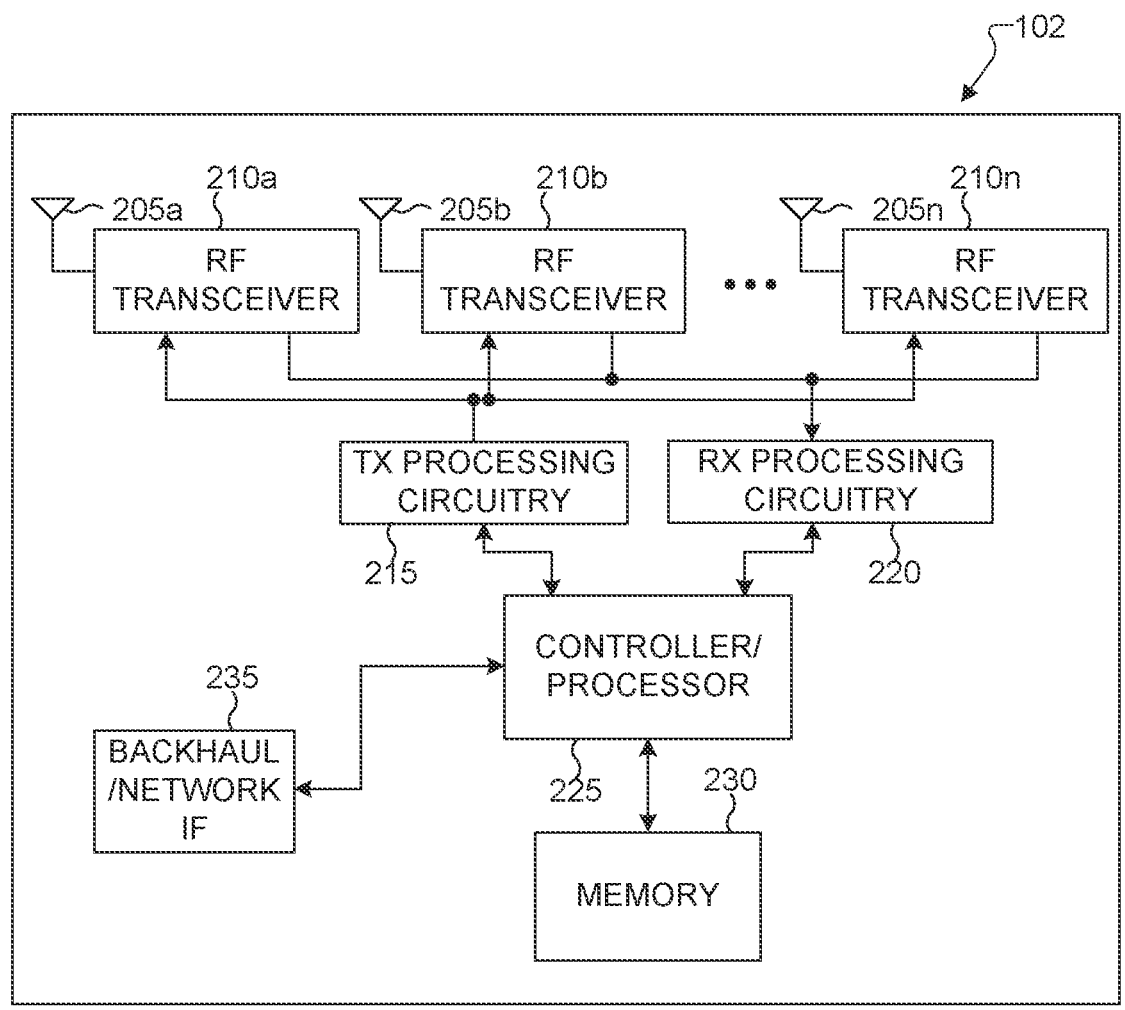
FIG. 2 illustrates an example gNB according to embodiments of the present disclosure.
Figure 3:
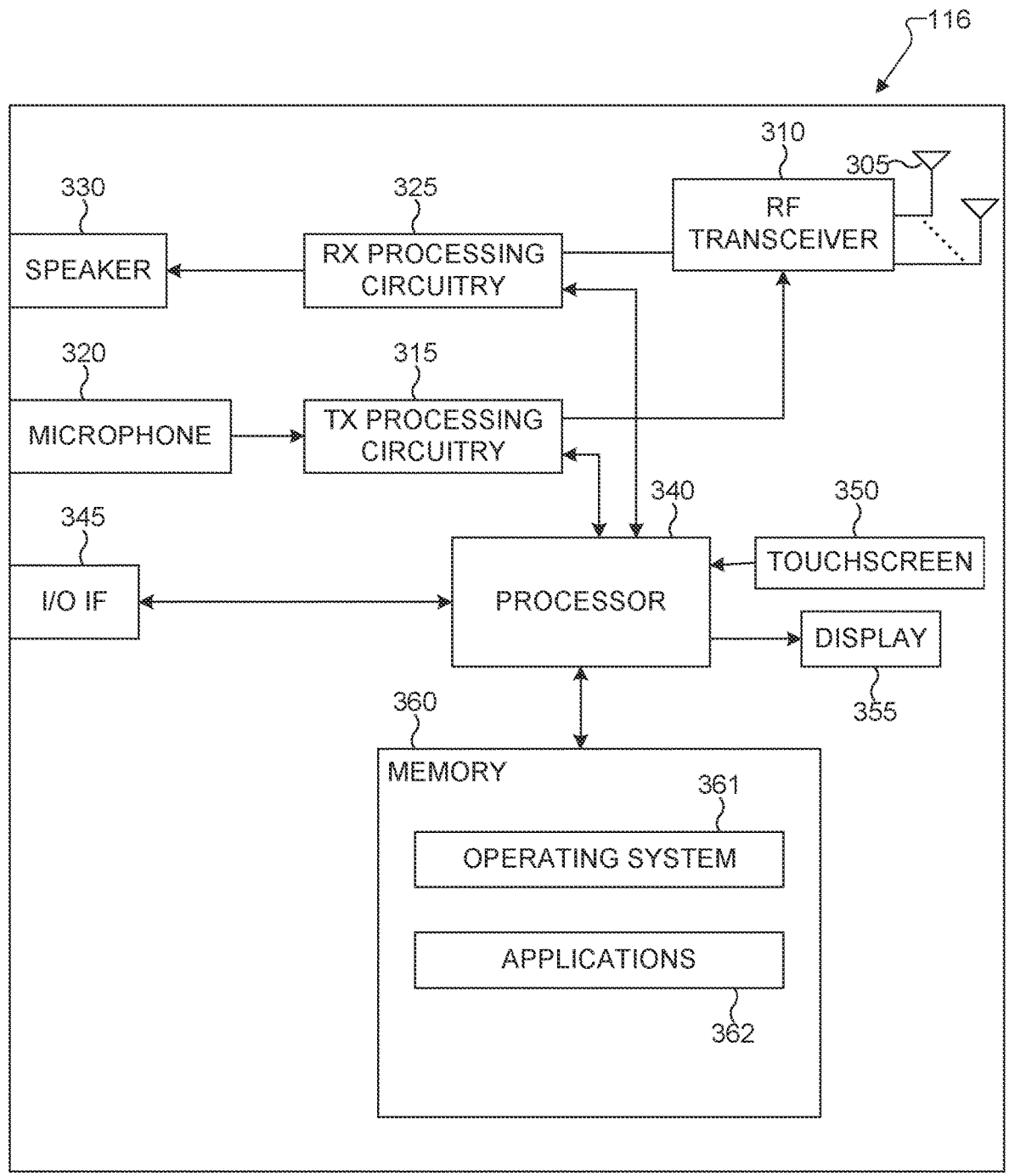
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about a channel state information (CSI) report, the configuration information including a number of radio remote heads (RRHs), $N_{RRH} > 1$; selecting a subset of RRHs from the $N_{RRH}$ RRHs independently for each subband (SB); determining the CSI report including an indicator indicating the selected subset of RRHs for each SB; and transmitting the CSI report including the indicator indicating the selected subset of RRHs for each SB. One or more of the gNBs 101-103 includes circuitry, programing, or a combination thereof, for generating configuration information about a channel state information (CSI) report, the configuration information including a number of radio remote heads (RRHs), $N_{RRH} > 1$; transmitting the configuration information; and receiving the CSI report including an indicator indicating a selected subset of RRHs for each subband (SB); wherein the subset of RRHs is selected from the $N_{RRH}$ RRHs independently for each subband (SB).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about a channel state information (CSI) report, the configuration information including a number of radio remote heads (RRHs), $N_{RRH}>1$; selecting a subset of RRHs from the $N_{RRH}$ RRHs independently for each subband (SB); determining the CSI report including an indicator indicating the selected subset of RRHs for each SB; and transmitting the CSI report including the indicator indicating the selected subset of RRHs for each SB. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
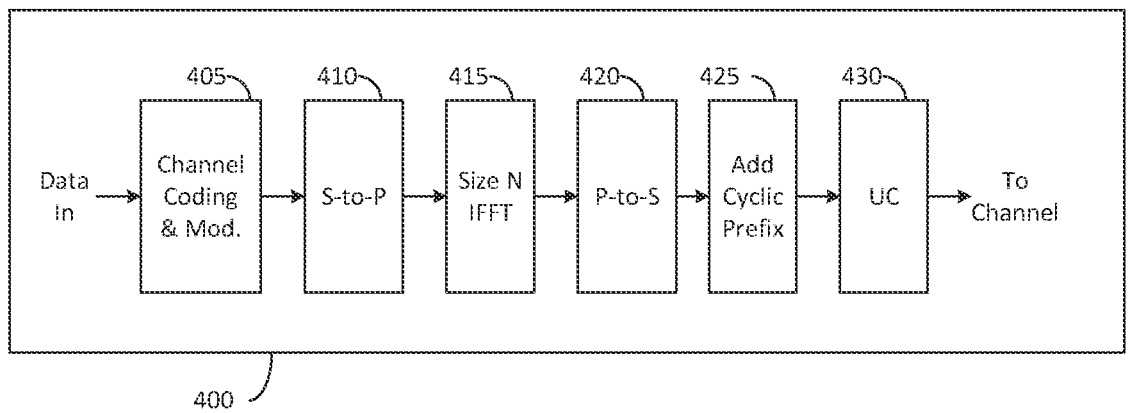
FIG. 4A illustrates a high-level diagram of an orthogonal frequency division multiple access transmit path according to embodiments of the present disclosure.
Figure 4B:
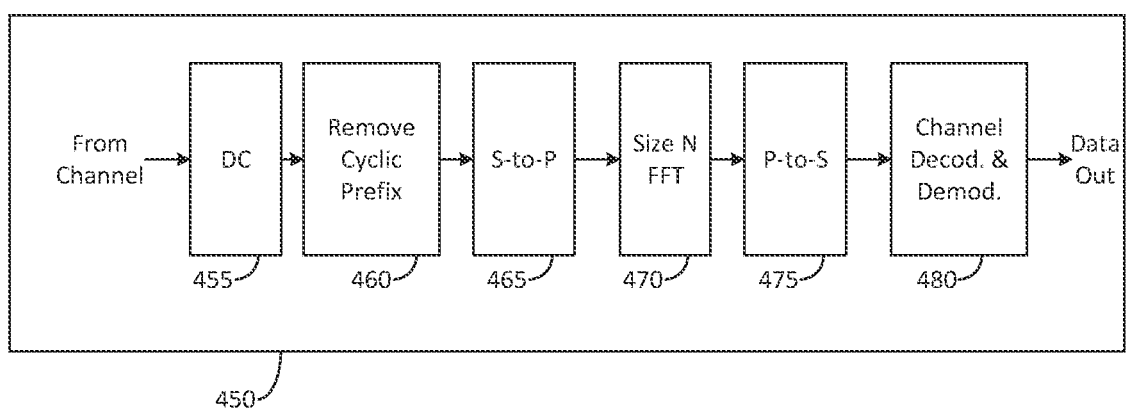
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+y \cdot N_{EPDCCH})$ mod D RBs for a total of $Z=O_F+\lfloor(n_{s0}+y \cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
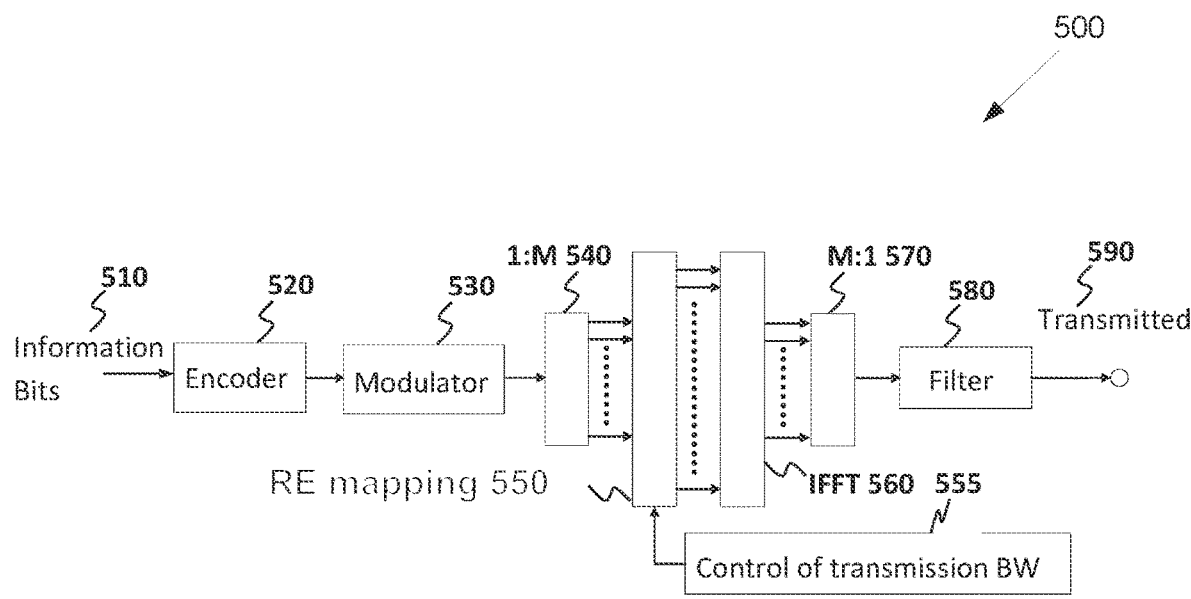
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
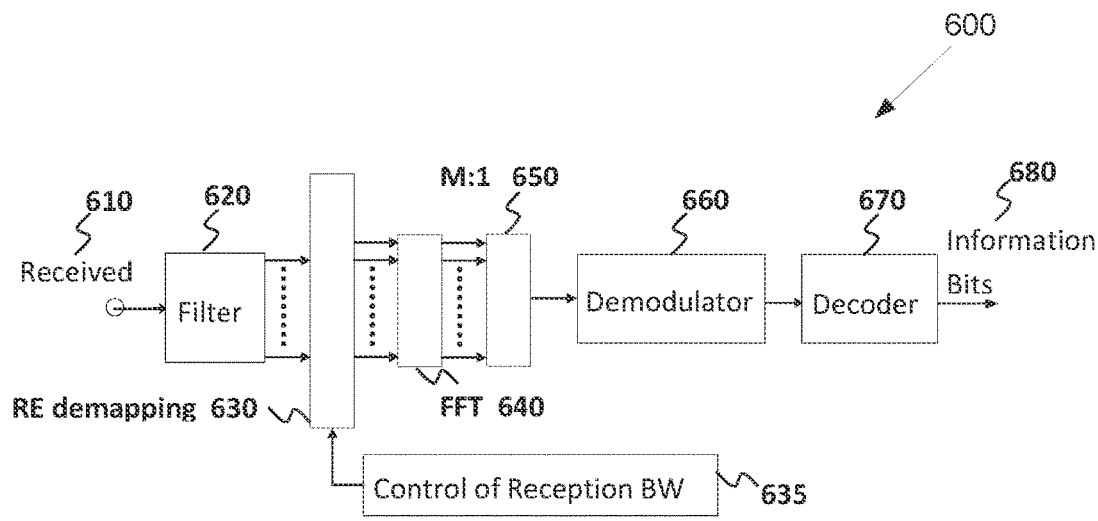
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
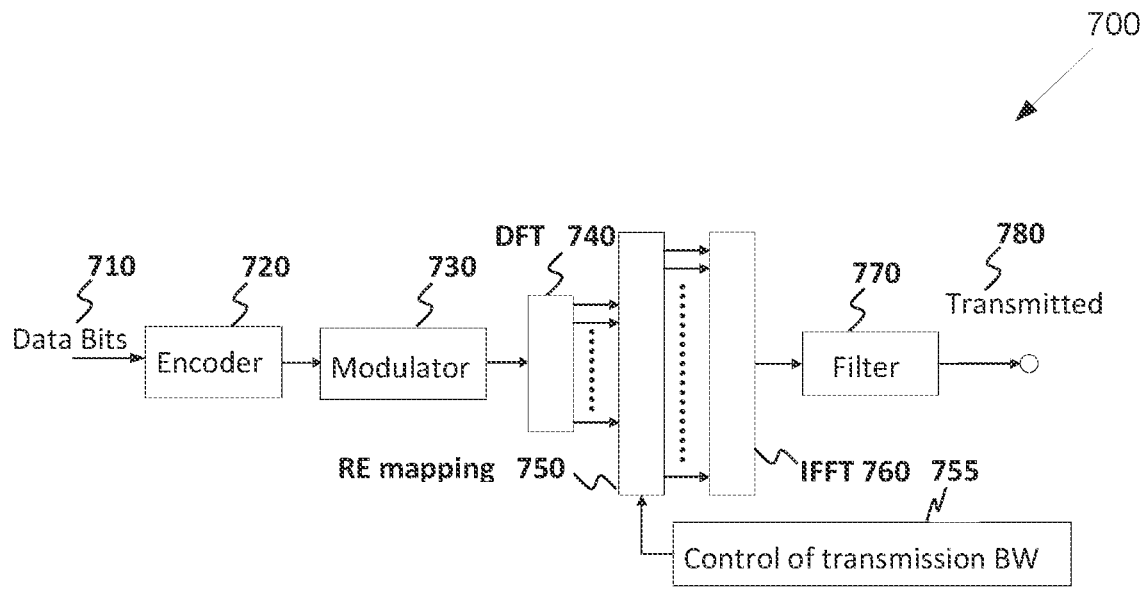
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
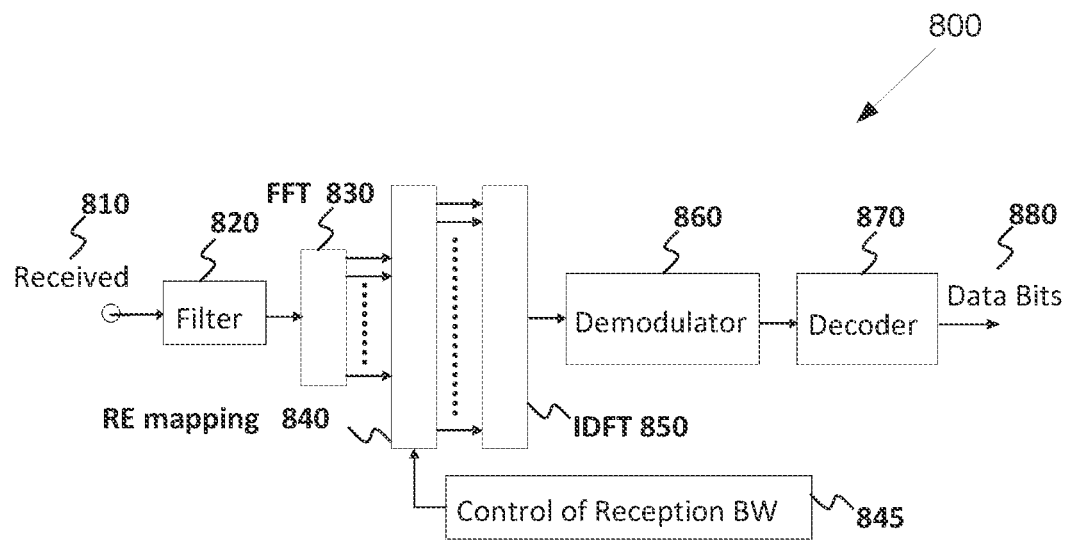
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies an FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
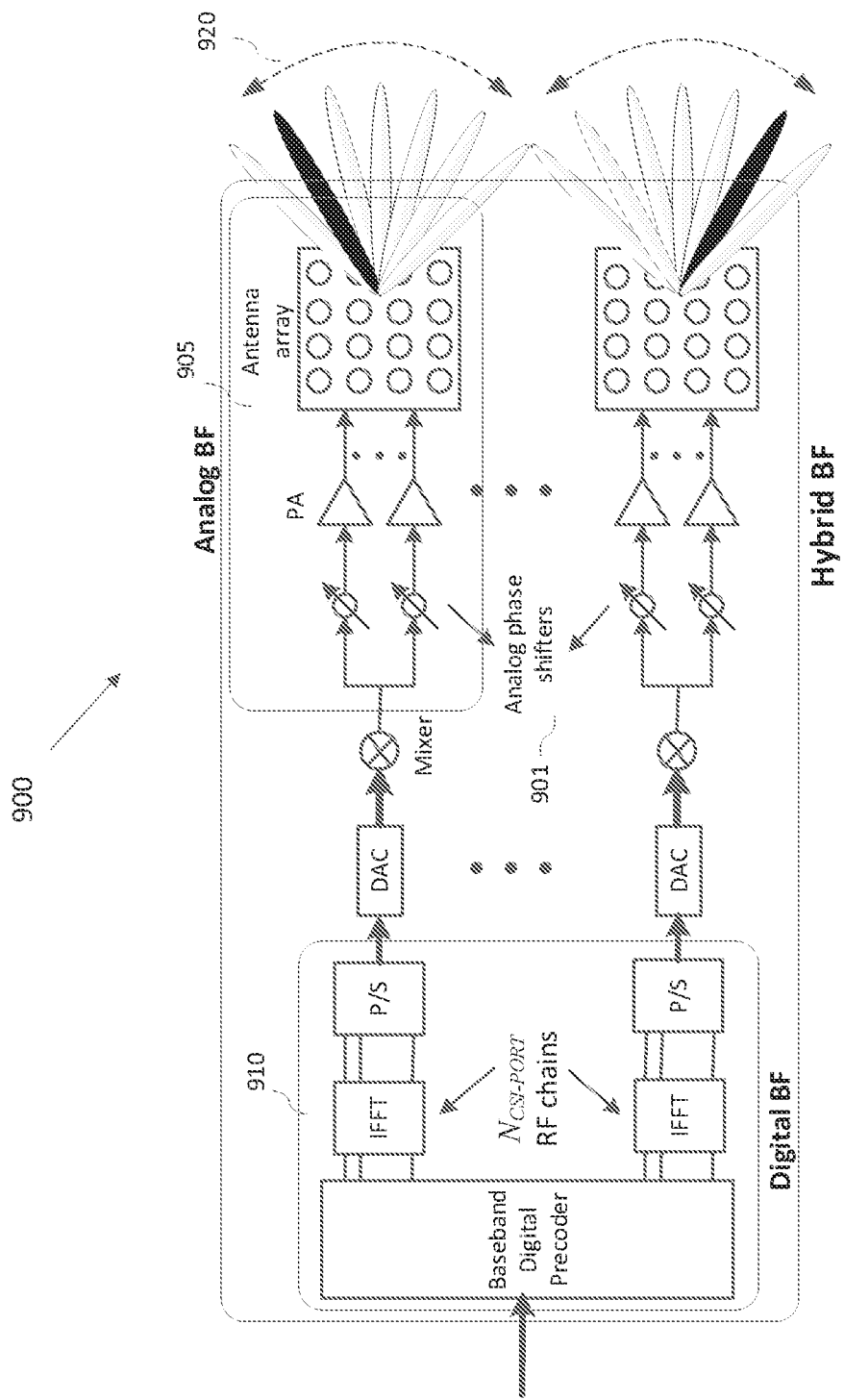
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

Rel.14 LTE and Rel.15 NR specifications support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength. As an example, for the case of the wavelength size ($\lambda$) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

In one embodiment, this disclosure considers a distributed MIMO system, and proposes a concept of MIMO, namely modularized MIMO, which is an evolution path of distributed MIMO, and provides several components to support modularized MIMO operations. In this disclosure, several components including advanced CSI codebook design with adaptive codebooks, advanced CSI reporting, AI/ML-based CSI acquisition, and calibration for distributed antennas are proposed to support modular MIMO operations.

The transition from 4G to 5G is being proven as another success in the cellular industry. By the end of 2020, 140 operators in 59 countries (or territories) have launched commercial 5G services [1]. It is expected that the 5G deployment will accelerate considerably over the coming years. In retrospect the lifecycle of past cellular generations, it is the time to incubate technologies for 6G [2].

5G New Radio (NR) achieved various technical advances including the support of different verticals, the network slicing, and the use of mmWave bands, just to name a few. From multiple-input multiple-output (MIMO) antenna technology perspectives, NR defined a series of beam management operations for hybrid beamforming in mmWave band. Admittedly, the MIMO for sub-6 GHz has been redefined largely based on the previous generation Long Term Evolution (LTE) system, and the technical advances fall short compared to mmWave band.

As the cellular industry continuously pushes the boundary of its operating frequency to acquire even wider bandwidth, it is expected that 6G will further embrace THz bands extending 5G mmWave technology. However, it is also expected that the importance of sub-6 GHz band, as an anchor carrier to high frequency bands, will become even more significant due to the limited cell coverage and lower connection reliability at high frequency bands, as witnessed from 5G deployment. On the other hand, low band can easily become a bottleneck as it is usually paired with multiple high frequency carriers and covers wide area, which results in multiplexing of a large number of user equipment (UE) over relatively smaller bandwidth. Therefore, it is the motivation of this disclosure to share a candidate technology for 6G that can improve the spectral efficiency mainly in sub-6 GHz band.

Full-dimension (FD) MIMO was introduced in LTE Release 13 [3]. The base station antenna port mapping was extended to two-dimension, which allows beamforming in elevation direction in addition to the conventional azimuth direction. It became also possible to control many antenna elements at a reduced complexity with the transceiver unit (TXRU) virtualization for grouping multiple antenna elements into a logical antenna port. With the recent advances of active antenna array technology, the FD-MIMO was designed to support massive MIMO antennas at base station in a computationally efficient manner. NR MIMO was also built on the same technical foundation.

On the other hand, the number of antenna elements that can be integrated on a practically feasible antenna size is substantially restricted at low bands due to the half-wavelength distancing needed between antenna elements. The size of 4×8 antenna panel at sub-1 GHz carrier frequency can be comparable to the size of a small size car, which is impractical in most deployment scenarios. This exemplifies the difficulty of exploiting massive MIMO technology at the low bands. In this disclosure, we introduce the modular massive MIMO (mmMIMO) technology in which one or multiple basic antenna modules are predefined, which can be flexibly connected to form a single system according to the deployment scenario.

mmMIMO falls into the category of distributed MIMO (DMIMO) technology, which has been studied in academia for a while [6]. D-MIMO can be understood as a form having a limited number of the same basic antenna modules. Also, it is worthwhile to note that D-MIMO is linked to the notion of the cell-free network where multiple distributed access points, each with a single antenna, form a single massive MIMO system [7]. This will make the conventional notion of a cell blurry as multiple distributed antennas operate as a single cell in effect. D-MIMO is also related to LTE coordinated multipoint (CoMP) and NR multiple transmission and reception points (mTRP) technologies. D-MIMO and CoMP/mTRP are similar in that they utilize multiple TRPs for cooperative communications via, e.g., joint transmission (JT). However, coherent JT from multiple TRPs has not been primarily focused in CoMP/mTRP, whereas D-MIMO rather treats the distributed antennas as one antenna system allowing to achieve the ultimate performance of distributed antennas, focusing more on coherent JT. From a standardization point of view, it can be expected that the structured D-MIMO with a limited number of the identical antenna modules, can be initially supported as a 5G evolution. Ultimately, 6G standardization will head in the direction of allowing the full flexibility of mmMIMO with various shapes and increased number of basic antenna modules to achieve the benefits of massive MIMO anywhere and in any carrier frequency.

It is noted that mmMIMO, including structured D-MIMO, has not been formally standardized for cellular communication yet. We believe that the technology is mature enough to be commercially introduced in 6G as several proof-of-concept demonstrations have been already performed [8]. In this regard, the objective of this disclosure is to generalize the known concept of D-MIMO into mmMIMO and to propose necessary research efforts for 6G standardization including advanced CSI codebook (CB) design. Also, the performance gains that mmMIMO can bring into 6G will be quantified with system-level simulation (SLS) results along with advanced proposed CSI codebooks.

mmMIMO can be viewed as an evolved form of the structured D-MIMO with various predefined basic antenna modules and flexible combinations of them to build a single antenna system. Several possible basic antenna modules may be used with cross-polarization antennas, a close resemblance to modular blocks. Not only the rectangular antenna modules but also other irregular shapes are possible such as L-shaped antenna module for the installations in the corner of buildings or bow-shaped antenna modules for the installation on the curved building surfaces. Through the basic antenna module concept, numerous challenges in the field deployment can be overcome by flexibly aggregating the available basic antenna modules.

mmMIMO is beneficial in low bands to achieve the gain of massive MIMO without being constrained by the antenna form factor. Moreover, one large antenna panel is aesthetically unpleasant and also can be dangerous with high winds. The mmMIMO antennas can be installed in any combination of the basic antenna modules on attachable surfaces of buildings. A group of horizontal antennas and a group of vertical antennas can steer beams in azimuth and elevation directions, respectively. Although the example describes mmMIMO on a building, it will be applicable to various use cases and deployment scenarios.

The full flexibility of mmMIMO can be useful regardless of the carrier frequency. In high bands, a single antenna panel can already integrate a sufficient number of antenna elements. Nonetheless, by connecting multiple antenna panels to a single base unit and controlling them jointly, not only can the deployment cost be lowered but interference management can also be more readily done just as for one cell.

5G NR has developed two types of CSI feedback mechanism, namely low-resolution (Type-I) and high-resolution (Type-II) codebooks, to support various use cases and in considerations of different levels of UE capabilities. In Type-I CSI codebook, one or four neighboring wideband (WB) Discrete Fourier Transform (DFT) beam vectors can be chosen, and the dominant eigenvector direction is expressed via single DFT beam selection per subband (SB). Thus, the Type-I CSI codebook has low feedback overhead. Nevertheless, it is expected to work reasonably well for SU-MIMO since capturing a dominant direction of the channel for a given UE is usually sufficient and the system performance is less sensitive to precise precoder selection at the base station (BS). For multiuser- (MU-)MIMO transmission, however, high-resolution CSI capturing multiple dominant directions of the channels can be essential to suppress inter-user interference by precisely selecting precoder at the BS for spatial multiplexing amongst different UEs, which is why Type-II CSI codebook has been developed.

The Type-II CSI codebook has been designed based on the concept to represent an eigenvector of the channel via linear combination (LC) of chosen basis vectors and their corresponding coefficients. For channels having a high rank, dominant eigenvectors of the channels can be reported and each of the dominant eigenvectors is quantized via the LC codebook independently but with a common set of basis vectors. In Rel-15 Type-II CSI feedback, spatial domain (SD) basis vectors are reported in a WB manner, i.e., one common basis set for all SBs and the coefficients of the common basis are quantized for each SB and reported to the BS. In addition to a SD basis, frequency domain (FD) basis vectors were additionally introduced in the Rel-16 for Type-II codebook to further reduce the CSI feedback overhead by compressing channel coefficients in both spatial and frequency domains. The Rel-16 Type-II codebook, which is also called as enhanced Type-II, will be explained in further details in the following subsection.

While the Rel-15/16 Type-II CSI codebook only supports single-panel (SP) case so far (until the current Rel-17), the Type-I CSI codebook supports both cases where the BS has a SP or multiple panels (MP). However, the supported antenna array structures for Type-I MP case are restricted to either 2 or 4 of identical and collocated antenna panels, which results in a common beam selection across panels but with additional inter-panel co-phase coefficient feedback.

The Rel-16 Type-II CSI codebook (known as eType-II) can be a good starting point to further evolve the CSI frameworks tailored for distributed MIMO including structured D-MIMO and/or mmMIMO. In this subsection, we briefly introduce the eType-II CSI framework to gain an insight on possible extension to distributed cases which will be discussed in the next section.

For a given layer, i.e., spatial stream or certain channel eigenvector direction, the eType-II CSI codebook consists of three components ($W_1$, $W_2$, and $W_f$) and can be expressed as $$W = W_1 W_2 W_f^H \quad (1)$$

where $W_1$ and $W_f$ are N×2L and K×M basis matrices composed of SD and FD basis vectors, respectively, and $W_2$ is an 2L×M coefficient matrix corresponding to SD and FD vector pairs. Here, N, K, 2L, and M are the numbers of antenna ports (or CSI-RS ports) at the BS, SB s, SD basis vectors, and FD basis vectors, respectively.

The SD basis matrix $W_1$ is selected from a pre-defined set of 2-D DFT basis vectors according to the configured 2-D BS antenna layout comprising of $N_1$-by-$N_2$ dual-polarized antenna ports (i.e., $N=2N_1N_2$) and oversampling factors $O_1$ and $O_2$. The pre-defined 2-D DFT basis set has $O=O_1O_2$ orthogonal bases for the whole $N_1N_2$-dimensional space and one orthogonal basis is selected among them. Once an orthogonal basis is selected, L out of the $N_1N_2$ orthogonal vectors are commonly selected for both polarizations and layers to construct $W_1$ and reported to the BS Similar to the SD basis matrix selection, the FD basis matrix $W_f$ is selected from a pre-defined set of 1-D DFT vectors according to the configured SB size and an oversampling factor $O_3$. One distinct feature from the SD basis matrix is that the FD basis vectors can be independently selected for different layers.

For the coefficient matrix $W_2$ corresponding to the SD/FD basis vector pairs, each element of $W_2$ is decomposed into phase and amplitude, and they are selected from respective codebooks. The phase of each element is reported using either a 3-bit or 4-bit phase-shift keying (PSK) phase codebook, and one of them can be configurable via higher-layer signaling. For the amplitude of each element, it is further decomposed into a reference value (polarization common) and a differential amplitude value (polarization specific), and they are selected 4-bit and 3-bit amplitude codebooks that are composed of equidistant points in [0,1] in 1.5 dB and 3 dB scales, respectively.

Although the eType-II CSI codebook provides high resolution CSI feedback at a reduced feedback overhead, it has been designed under the restricted antenna structure, i.e., 2-D rectangular single panel antenna array layouts. Thus, directly applying the eType-II CSI codebook framework to mmMIMO scenarios would not work well. Moreover, the pre-defined set of the SD basis may not properly capture diverse beam directions from flexibly deployed distributed antenna modules.

Before we propose an advanced CSI codebook design tailored for mmMIMO, we first introduce a couple of approaches to extend the current eType-II CSI codebook to be applicable to the structured D-MIMO, which could be a steppingstone towards ultimate evolution to mmMIMO.

One possible extension of the eType-II CSI is to provide a framework that utilizes the eType-II CSI codebook per antenna module and additionally introduces an inter-module component to adjust phase difference and amplitude imbalances across modules. The structure of the codebook (called CB1 hereafter) can be expressed as $$W = \begin{bmatrix} W_{1,1} W_{2,1} W_{f,1}^H Q_1 \\ \vdots \\ W_{1,G} W_{2,G} W_{f,G}^H Q_G \end{bmatrix} \quad (2)$$

where $W_{1,g}$ and $W_{f,g}$ are N̄×2L and K×M basis matrices composed of SD and FD basis vectors, respectively, and $W_{2,g}$ is an 2L×M coefficient matrix corresponding to SD and FD vector pairs, for antenna module g=1, . . . , G. Here, N̄ is the number of antenna ports per antenna module, i.e., N̄=N/G, where N is the total number of antenna ports at the BS and equal number of antenna ports per antenna module is assumed. $Q_g$ is a K×K diagonal matrix with $q_{g1}, \ldots, q_{gK}$, each of which contains phase and amplitude values for antenna module g=1, ..., G.

In CB1 shown in (2), SD and FD bases and corresponding channel coefficients are independently selected per antenna module using the eType-II codebook. For SD and FD bases, basis vectors could be indicated via a two-stage framework where a first stage indicates a union of selected basis vectors for all antenna modules and a second stage indicates selected vectors for each module from the union set. The two-stage framework can reduce the feedback overhead if there are enough overlapped beams across antenna modules. In addition, the complex coefficients of $Q_g$, called the inter-module component, are selected/reported separately with respect to reference antenna modules to compensate for the power imbalance and phase mismatch between antenna modules. The reference antenna module can be differently chosen based on the strongest amplitude of inter-module component for each SB. Here, the strongest amplitude can be regarded as one and thus no reporting is needed. With this inter-module component, coherent transmission across different modules can be achieved by the BS. The inter-module components can be selected/reported in a SB or WB manner depending on the configuration. If it is performed in the WB manner one scalar value becomes enough to represent the inter-module component, i.e., $Q_g = g_q I$, for each module g.

One inherent aspect of the codebook framework is to facilitate dynamic antenna module selections at the BS using the reported feedback values. Based on the available feedback information and other users' channel environments, the BS can determine to perform either single transmission or joint transmission with arbitrary combination of the antenna modules.

Another approach based on the eType-II CSI is to support a framework that separately selects a SD basis per antenna module and regards a whole SD basis matrix obtained by diagonally stacking SD bases for all modules as $W_1$ to be applied into the eType-II framework. The structure of the codebook (called CB2 hereafter) can be represented as $$W = \underbrace{\begin{bmatrix} W_{1,1} & 0 & 0 \\ 0 & \ddots & 0 \\ 0 & 0 & W_{1,G} \end{bmatrix}}_{\tilde{W}_1} \tilde{W}_2 \tilde{W}_f^H \quad (3)$$

where $\tilde{W}_1 = \text{diag}[W_{1,1}, \ldots, W_{1,G}]$ is an G$\bar{N}$×2GL whole SD basis matrix that diagonally stacks SD bases for all modules and $\tilde{W}_f$ is a K×M common FD basis matrix, and $\tilde{W}_2$ is a 2GL×M coefficient matrix corresponding to the SD/FD basis vector pairs.

In CB2 shown in (3), a SD basis is independently selected per antenna module, but compressed coefficients of $\tilde{W}_2$ are selected jointly across modules using a common FD basis $\tilde{W}_f$. Since SD bases are independently selected per antenna module, the two-stage framework can also be applicable to CB2 to efficiently indicate SD basis vectors. The underlying principle of CB2 is to exploit the fact that channels across antenna modules can be less spatially correlated than channels within each antenna module whereas channels for all antenna modules can be correlated across SBs since the same bandwidth associated with the configured SBs are used for all the modules with a given subcarrier spacing.

The proposed codebooks based on the eType-II CSI in the previous section could be potential solutions for mmMIMO as well as structured D-MIMO. However, the amount of CSI feedback overhead increases linearly with the number of distributed antenna modules as SD basis selection is performed separately for each module. Moreover, the proposed schemes have limited flexibility that could not be easily generalized to various constructions of mmMIMO. For example, if we consider a simple extreme case where mmMIMO is formed with multiple distributed antenna modules equipped with single antenna port, the proposed codebooks can only compress channel coefficients in frequency domain, not in spatial domain. Furthermore, there could be still certain degree of spatial correlation that can be exploited amongst not only non-collocated but also adjacent antenna modules in the mmMIMO, which is neglected in the extensions of eType-II proposed in the previous section.

In this section, we propose an advanced CSI codebook scheme enabling efficient CSI feedback for mmMIMO, which also does not require certain structural confinements for antenna arrays at the BS. In a nutshell, by designing the CSI codebook to express quantized values of the principal singular values and the corresponding left and right singular vectors of the entire MIMO channel, the CSI for mmMIMO comprised of multiple distributed antenna modules can be jointly and efficiently compressed based on the theory of principal component analysis (PCA).

We consider mmMIMO channels $H_{N_g,N_{RX}}(k)$ for g=1, 2, ..., G, and for k=1, ..., K, where $N_g$, $N_{RX}$, K, and G are the number of antenna ports at antenna module g, number of antenna ports at the UE, number of SBs, and number of antenna modules at the BS, respectively. For each SB k, we stack the mmMIMO channels of all modules to form the whole N×$N_{RX}$ mmMIMO channel matrix, i.e., $$H_{N,N_{RX}}(k) = [H_{N_1,N_{RX}}^T(k) H_{N_2,N_{RX}}^T(k) \ldots H_{N_G,N_{RX}}^T(k)]^T,$$

where $N = \Sigma_g N_g$. Then, we take the singular value decomposition (SVD) of $H_{N,N_{RX}}(k)$ to find its $\mathcal{V}$ dominant left-singular vectors for each SB k, where $\mathcal{V} \leq \min(N, N_{RX})$. Now, for a given v=1, ..., $\mathcal{V}$, we can form the N×K matrix composed of the v-th dominant left-singular vectors for all $\{H_{N,N_{RX}}(k)\}_{k=1}^K$, and denote the matrix by $\tilde{H}_{N,K}^{(v)}$.

To quantize $\tilde{H}_{N,K}^{(v)}$ efficiently, we propose an advanced CSI codebook based on PCA wherein the D principal singular values and the corresponding left and right singular vectors for the whole mmMIMO channel matrix $\tilde{H}_{N,K}^{(v)}$ are to be quantized and then reported, which is given by, $$\tilde{H}_{N,K}^{(v)} \cong W = U_D \Sigma_D V_D^H = \Sigma_{d=1}^D \sigma_d^2 v_d^H \quad (4)$$

where $\sigma_d^2$, $u_d$, and $v_d$ are the components for the d-th principal singular value and the corresponding N×1 left- and K×1 right-singular vectors, respectively, and D≤min(N,K). In other words, through quantizing the D left and right orthonormal basis directions for $\tilde{H}_{N,K}^{(v)}$ in the order of D largest variances, the channel matrix $\tilde{H}_{N,K}^{(v)}$ can be jointly and efficiently compressed in the spatial and frequency domains.

One can consider a pre-defined set consisting of unit-norm vectors for codebooks of $u_d$ and $v_d$, similar to the DFT codebook used in the Type-II LC codebook. Note that, in Type-II LC codebook, most of channel information is contained in the coefficient feedback for DFT bases comprising LC. However, in the PCA framework, left and right singular vectors contain the most of channel information. Therefore, high resolution representation of singular vectors is a crucial part of codebook design, and selecting them from a pre-defined set of codebook, such as the DFT codebook, could be too coarse to represent singular vectors. Thus, we propose an explicit quantization for each element of $u_d$ and $v_d$ using phase and amplitude codebooks. In this disclosure, we use a 3-bit PSK phase codebook and a 3-bit amplitude codebook having equidistant points in [0,1] in 3 dB scale for quantizing each element of left and right singular vectors $u_d$ and $v_d$.

Singular vectors of a matrix have two properties: 1) they are orthogonal to each other, and 2) each singular vector is a unit norm vector. Using these two properties, we propose novel adaptive codebooks to reduce the amount of CSI feedback while, at the same time, achieving a better resolution in quantizing singular vectors $u_d$ and $v_d$.

Adaptive codebook using the orthogonal property: Consider left singular vectors $u_1, \ldots, u_{d-1}$ corresponding to the first d−1 principal singular values, for $2 \leq d \leq D$ (the same approach of adaptive codebook can be directly applicable to the case of right singular vectors). Then, the next left singular vector $u_d$ corresponding to the d-th singular value should lie on the orthogonal complement of the subspace spanned by $u_1, \ldots, u_{d-1}$, by the orthogonal property. Note that the orthogonal complement is an N−(d−1) dimensional subspace and thus $u_d$ can be expressed by using N−(d−1) basis vectors for the orthogonal complement. Based on this property, we propose the following adaptive codebook as shown in Table 1.

rule is shared by the BS and UE, and it utilizes an algorithm such as the orthogonal iteration method with a given initial orthogonal matrix shown in Table 2 to find the same N−(d−1) singular vectors, $\tilde{u}_1, \ldots, \tilde{u}_{N-(d-1)}$, for the BS and UE to form the same basis. As shown in Table 2, the orthogonal iteration method with a given initial matrix $Q_0$ computes the unique basis of $\tilde{u}_1, \ldots, \tilde{u}_{N-(d-1)}$. Note that at step (b) of Table 2, the $Q_0$ decomposition under the constraint that the diagonal elements of $\mathcal{R}_i$ are positive guarantees that the pair solution of $Q_i$ and $\mathcal{R}_i$ is unique, which turns out that the $Q_1$ is also unique. After the basis for the orthogonal complement is obtained, only N−(d−1) coefficients need to be selected from the phase and amplitude codebooks, and to be reported to the BS. Thus, the amount of CSI feedback can be reduced from ND to $\Sigma_{d=1}^{D} N-(d-1) = ND-(D-1)D/2$. For the right singular vectors, similarly, the amount of CSI feedback can be reduced to KD−(D−1)D/2 with the same approach.

TABLE 1

Adaptive codebook using the orthogonal property

1. Initial Step:
   Find the first principal singular vector $u_1$ and select each element of $u_1$ from the phase and amplitude codebooks, denote the elements by $\{c_{i,1}\}_{i=1}^{N}$.
2. For d = 2: D do
   (a) $U_{1:d} = [u_1 \ldots u_{d-1}]$.
   (b) Find $\mathcal{P}_{\tilde{U}_{1:d}^\perp} = I - U_{1:d}(U_{1:d}^H U_{1:d})^{-1} U_{1:d}^H$, which is a projection matrix onto the orthogonal complement of the subspace spanned by $u_1, \ldots, u_{N-(d-1)}$.
   (c) Find N − (d − 1) singular vectors corresponding to non-zero singular values for $\mathcal{P}_{\tilde{U}_{1:d}^\perp}$ with a pre-defined rule such as the algorithm shown in Table 2, and denote them by $\tilde{u}_1, \ldots, \tilde{u}_{N-(d-1)}$.
   (d) Find linear combination coefficients using the phase and amplitude codebooks to represent $u_d$ based on the basis vectors $\tilde{u}_1, \ldots, \tilde{u}_{N-(d-1)}$, i.e., $u_d = \Sigma_{i=1}^{N-(d-1)} c_{i,d} \tilde{u}_i$.
3. Return $\{c_{i,d}\}_{i=1}^{N-(d-1)}$ for d = 1, \ldots, D;

In the proposed adaptive codebook, for each iteration d=2, . . . , D, the projection matrix onto the orthogonal complement of the subspace spanned by the selected $u_1, \ldots, u_{d-1}$ in the previous iteration is computed and then its N−(d−1) singular vectors corresponding to the non-zero singular values are derived with a pre-defined rule. The pre-defined

TABLE 2

Figure 10:
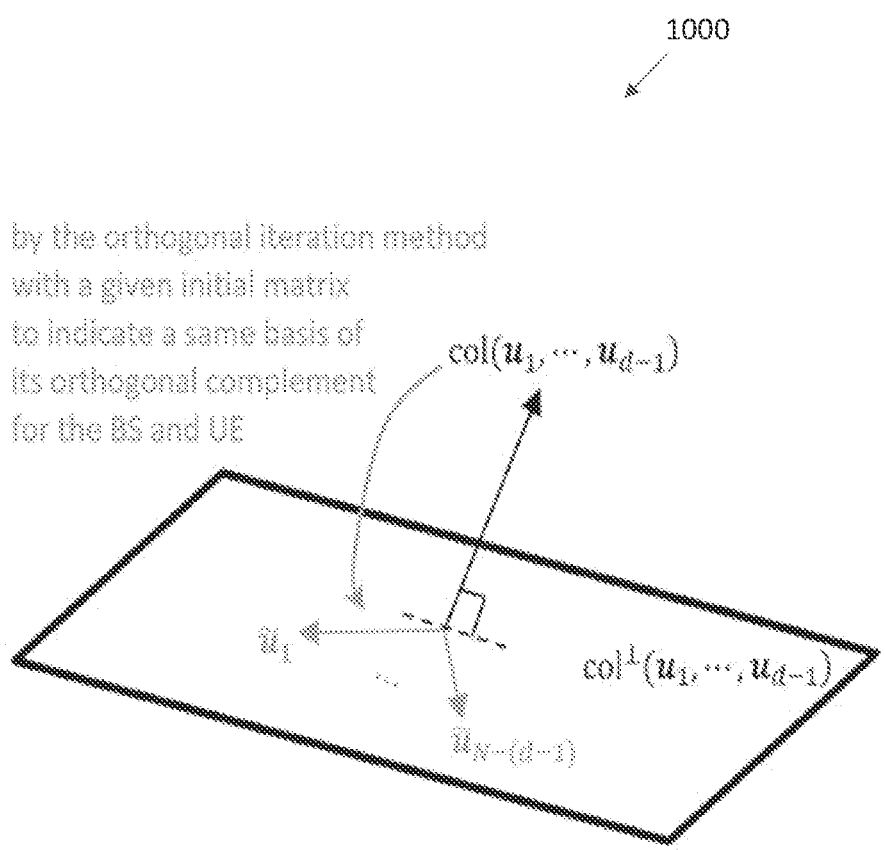
FIG. 10 illustrates a visual interpretation on finding a basis of the orthogonal complement of the subspace spanned by the $u_1, \ldots, u_{d-1}$ according to embodiments of the present disclosure.

Orthogonal iteration method with a given initial orthogonal matrix to find $\tilde{u}_1, \ldots, \tilde{u}_{N-(d-1)}$ 1. Input: The projection matrix $\mathcal{P}_{\tilde{U}_{1:d}^\perp}$, the parameter d, a given matrix $Q_0$ composed of N − (d − 1) orthonormal columns, and a number of iterations I.
2. For i = 1, 2, . . . , I do
   (a) Set $Z_i = \mathcal{P}_{\tilde{U}_{1:d}^\perp} Q_{i-1}$.
   (b) Perform the QR decomposition for $Z_i$, i.e., $Z_i = Q_i \mathcal{R}_i$ under the constraint that the diagonal elements of $\mathcal{R}_I$ are positive.
3. Return $Q_I = [\tilde{u}_1, \ldots, \tilde{u}_{N-(d-1)}]$;

FIG. 10 illustrates a visual interpretation 1000 on finding a basis of the orthogonal complement of the subspace spanned by the $u_1, \ldots, u_{d-1}$ according to embodiments of the present disclosure. The embodiment of the visual interpretation 1000 is for illustration only. FIG. 10 does not limit the scope of this disclosure to any particular implementation of the visual interpretation 1000.

Consider a unit-norm vector a in an N-dimensional space and that the amplitude of each element of a can be selected from an adaptive codebook using the unit-norm property, which is designed based on the following steps.

Define a base codebook $\mathcal{C}_1$ for amplitude values. For example, the n-bit codebook having $2^n$ equidistant points in [0,1] in 3 dB scale can be $\mathcal{C}_1$, like the one used in the eType-II codebook. For each $j=2, 3 \ldots, N$, define an adaptive codebook $\mathcal{C}_j$ that is determined by the base codebook $\mathcal{C}_1$ and parameter $\beta_j$, which is as follows:

$$\mathcal{C}_j = \{\beta_j \times c_n | c_n \text{ is in } \mathcal{C}_1 \text{ and } 0 \leq \beta_j \leq 1\}.$$

Note that the elements in $\mathcal{C}_j$ are scaled down by $\beta_j$ from the elements of $\mathcal{C}_1$. Here, $\beta_j$ is determined based on the unit-norm property, and for each j-th entry of a, denoted by $a_j$, it is selected from the adaptive codebook $\mathcal{C}_1$, where $$\beta_j = \sqrt{1 - \Sigma_{k=1}^{j-1} |a_k|^2}. \quad (5)$$

Here, $a_j$ is selected in the order of row index j and $\beta_j$ is also computed in the order of row index j. That is, $a_1$ is first selected from the base codebook $\mathcal{C}_1$, and then $\beta_2$ is computed using (5) to construct $\mathcal{C}_2$, and then $a_2$ is selected from $\mathcal{C}_2$, and then $\beta_3$ is computed, and so on. Note that (5) enables codebooks to adaptively increase the resolution of elements while making sure the norm of the vector to be less than or equal to one.

Since the selected amplitude $a_j$ can be different from the true amplitude of $a_j$, (i.e., quantization error) a lower bound of $a_j$ can be used in computing $\beta_{j+1}$. For example, the largest value $a_j^*$ among the elements of $\mathcal{C}_1$ smaller than the selected amplitude $a_j$ is substituted into (5), i.e., $\beta_{j+1} = \sqrt{1 - \Sigma_{k=1}^{j-1} |a_k|^2}$. It guarantees that the range of the elements in $\mathcal{C}_{j+1}$ covers the true value of $a_{j+1}$. In another example, $a_j' = (a_j^* + a_j)/2$, which is the largest lower bound of $a_j$ considering the amplitude selection having the minimum distance, can be used in computing $\beta_{j+1}$.

Another approach is that the adaptive codebook mechanism is designed in the same ways as above, except that $\mathcal{C}_1$ is constructed as follows:

$$\mathcal{C}_1 = \{c_n \leq \beta_j | c_n \text{ is in } \mathcal{C}_1 \text{ and } 0 \leq \beta_j \leq 1\},$$

for $j=2, 3 \ldots, N$. That is, $\mathcal{C}_1$ contains only the elements of $\mathcal{C}_1$ which are less than or equal to $P_g$. The design mechanism makes the codebooks $\{\mathcal{C}_1\}$ to have the same resolution of $\mathcal{C}_1$ but to adaptively reduce their cardinality considering the unit norm property, thereby reducing the indication overhead.

To provide a reference for feedback overhead comparison among the proposed codebooks, i.e., CB1, CB2, and the advanced codebook, we assume a structured D-MIMO case where the equal number of $\overline{N} = N/G$ antenna ports are assumed per antenna module and $n_p$- and $n_a$-bit phase and amplitude codebooks are used. Then the amount of feedback overhead for CB1, CB2, and the advanced codebook for a given layer can be shown as in Table 3. For simplicity, we neglected some details in the overhead computation which can further reduce the feedback overhead such as strongest coefficient indication, zero-padding for weak elements, and the two-stage indication framework for selecting SD/FD basis vectors.

TABLE 3

Feedback overhead with respect to codebook methods

| Codebook Methods | Feedback overhead (bits) |
| --- | --- |
| CB1 | $\lceil \log_2 O_1 O_2 \rceil + \left\lceil \log_2 \binom{\overline{N}/2}{L} \right\rceil + \lceil \log_2 O_3 \rceil + \left\lceil \log_2 \binom{K}{M} \right\rceil + (2LM + K)(n_p + n_a)$ |
| CB2 | $\left(\lceil \log_2 O_1 O_2 \rceil + \left\lceil \log_2 \binom{\overline{N}/2}{L} \right\rceil + 2LM(n_p + n_a)\right)G + \lceil \log_2 O_3 \rceil + \left\lceil \log_2 \binom{K}{M} \right\rceil$ |
| Advanced CB | $D(N + K - (D - 1))(n_p + n_a) + Dn_a$ |

The main portion of feedback overhead comes from quantizing complex coefficients using phase and amplitude codebooks for CB1 and CB2, which correspond to $(2LM + K)(n_p + n_a)G$ and $2LM(n_p + n_a)G$ bits, respectively. On the other hands, the indication of selected SD/FD basis set for CB1 and CB2 only require $$\lceil \log_2 O_1 O_2 \rceil, \left\lceil \log_2 \binom{\overline{N}/2}{L} \right\rceil, \lceil \log_2 O_3 \rceil \text{ and } \left\lceil \log_2 \binom{K}{M} \right\rceil$$

bits, which does not incur much overhead compared to the amplitude and phase coefficient feedback. For the advanced CB, the feedback overheads of $D(N+K-(D-1))(n_p+n_a)$ and $Dn_a$ are needed to quantize the left/right singular vectors and singular values, respectively.

Figure 11:
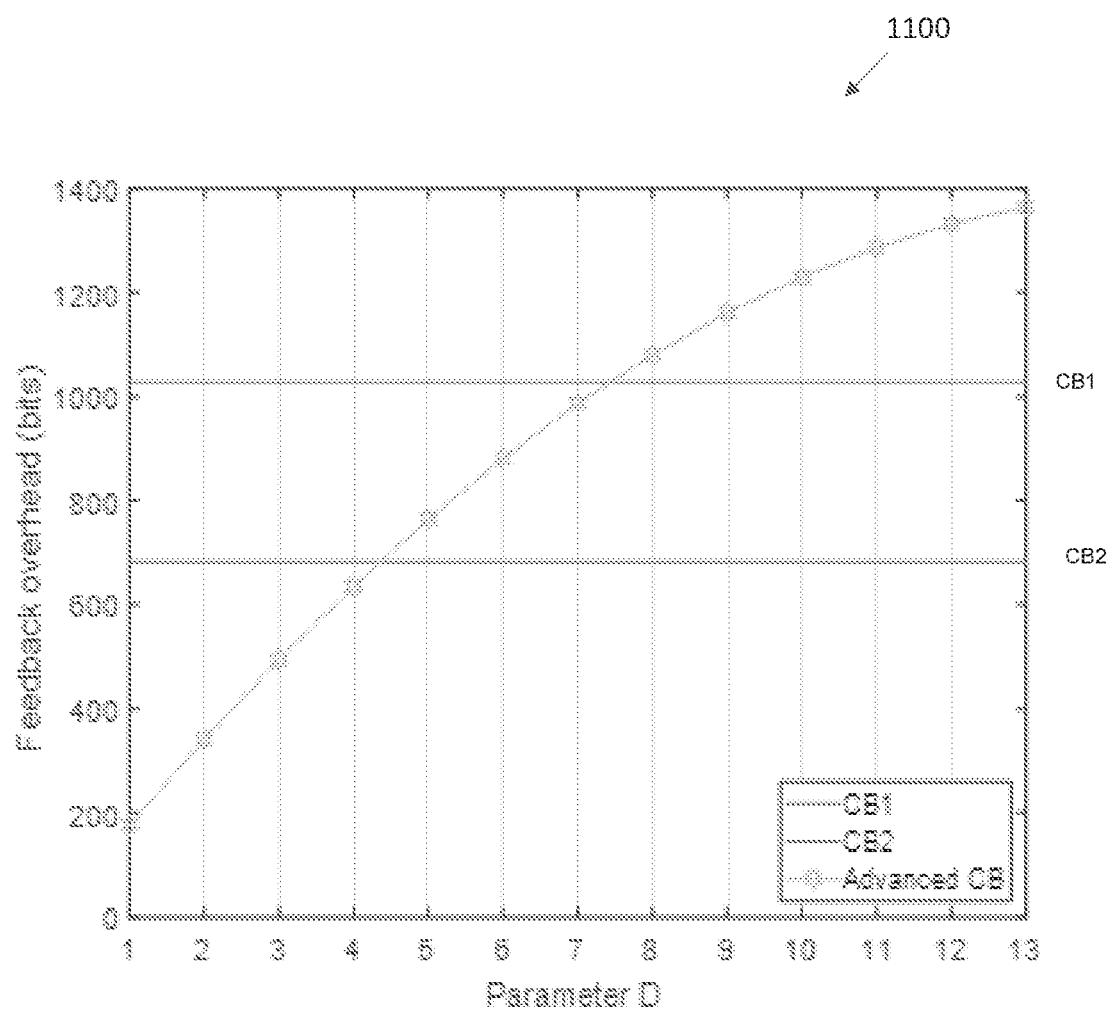
FIG. 11 illustrates an example of feedback overhead comparison 1100 of CB1, CB2, and advanced codebook with respect to parameter D according to embodiments of the present disclosure.

FIG. 11 illustrates an example of feedback overhead comparison 1100 of CB1, CB2, and advanced codebook with respect to parameter D according to embodiments of the present disclosure. The embodiment of the feedback overhead comparison 1100 is for illustration only. FIG. 11 does not limit the scope of this disclosure to any particular implementation of the feedback overhead comparison 1100.

FIG. 11 illustrates an example of feedback overhead comparison of CB1, CB2, and advanced codebook with respect to parameter D, which is a design parameter for sending feedback for the strongest D principal singular values and corresponding vectors, in the scenario of $(N, 2L, K, M) = (16, 4, 13, 7)$, $O_1 = O_2 = O_3 = 1$, $n_p = n_a = 3$ bits, and $G = 4$ (i.e., $\overline{N} = N/G = 4$). As shown in FIG. 11, up to $D=4$, the advanced CB has a lower feedback overhead compared to CB1/CB2, under the considered scenario. The feedback overhead of the advanced codebook becomes greater than that of CB2 and that of CB1, for $D > 4$ and $D > 7$, respectively.

In this section, we discuss several essential standard research problems to resolve key issues inherent in mmMIMO such as antenna calibration across distributed antenna modules, dynamic antenna module selection, and CSI acquisition/reporting.

Calibration is an important issue not only for mmMIMO but also for D-MIMO in general. Massive MIMO BSs use an on-board coupling network and calibration circuits, which we refer to as the on-board calibration for brevity, to measure the gain and phase differences among transceivers in the same radio frequency (RF) unit in order to maintain the reciprocity between DL and UL channels in the time division duplex (TDD) system. For the on-board calibration, one RF chain corresponding to one antenna port serves as a reference to other RF chains for other antenna ports. In the case of D-MIMO, such reference transceiver's signal needs to be shared between distributed modules, which are physically far apart. Using RF cables to distribute the reference is not preferable as it limits the deployment scenarios. In D-MIMO, the use of different local oscillators (LOs) between distributed antenna modules imposes even more challenges in achieving calibration as the phase of LOs could drift.

As noted, reciprocity calibration is critical for TDD systems but it becomes an issue even for frequency division duplex (FDD) D-MIMO systems. In FDD, DL transmissions are precoded based on the CSI feedback from the UE which already captures all the RF impairments as a part of channel. However, this is applicable only for UE-specific data channels, for which there exists CSI feedback, but not applicable for transmissions of common control signals or reference signals. As the latter is not based on the CSI feedback, it is difficult to effectively create a beam harmoniously between modules if the distributed modules are not calibrated with each other and have random phases and gains. In this regard, a standardized procedure for calibration can be defined. For example, a UE feeds back samples of DL channel coefficients through a feedback framework to the BS to match with UL channel coefficients measured from UEs' SRS.

One practical approach to reduce the amount of feedback is to send CSI only for a subset of antenna modules with favorable channel status, which we call dynamic antenna module selection (DAMS). Through DAMS, the diversity from different antenna modules can be fully exploited and, at the same time, the amount of CSI feedback can be opportunistically reduced by sending feedback for a subset of antenna modules having dominant channel qualities. DAMS can be performed either at the network or at UEs. When DAMS is performed at the network, the channel reciprocity is utilized, where an optimal antenna subset can be chosen by observing the UL channels at the distributed antenna modules from UEs' SRS. When DAMS is performed at UEs, the process involves reporting the chosen antenna subset from UEs, which requires standard support. In the SLS simulations of Section 7, it will be shown that the DAMS performed at the UEs has the potential to improve the throughput performance as well as to reduce the amount of feedback drastically.

Artificial intelligence (AI)-based CSI feedback, which resembles the problem of image compression and recovery, is an active area of research for efficiently acquiring CSI in massive MIMO systems. One example approach is CsiNet introduced in [10] by applying auto-encoders based on convolutional neural network (CNN) for CSI compression and reconstruction. It was shown that CsiNet can improve CSI recovery accuracy in terms of cosine similarity over existing compressive sensing methods. There have been numerous follow-up studies including the use of long short-term memory (LSTM), a type of recurrent neural network (RNN) [11]. It is expected that an AI-based approach can be effective to mmMIMO as explicit methods may not work well with non-collocated and non-uniform antenna configurations. It will be an interesting research if the performance of AI-based CSI feedback is compared with conventional codebook-based approach for mmMIMO.

There can be certain relationships between DL channels of panels if they are adjacent, and such relationships could be learnt by the network using AI/machine learning (ML) [12]. In this case, it could be enough for a UE to report the CSI corresponding to the most representative panel within a group of adjacent panels, and the network can infer the CSI of other panels through learning. As one way to avoid the need for defining codebooks in FDD systems, there are research efforts to estimate DL channel from UL channel using AI/ML approach [12], [13], even though the channel reciprocity is usually not assumed in the FDD spectrum due to the frequency gap between DL and UL.

CSI reporting can be enhanced in the time domain. In the case of mmMIMO, the high volume of CSI feedback can be split into several smaller CSI reports. For example, each smaller CSI report could contain the feedback information corresponding to each antenna module or each collocation group. Another approach would be to introduce multi-stage CSI feedback. In this approach, the first-stage CSI feedback can include common CSI part, such as common beam basis, and the second-stage CSI can include information specific to each antenna modules, such as quantization values for each basic antenna module.

Figure 12:
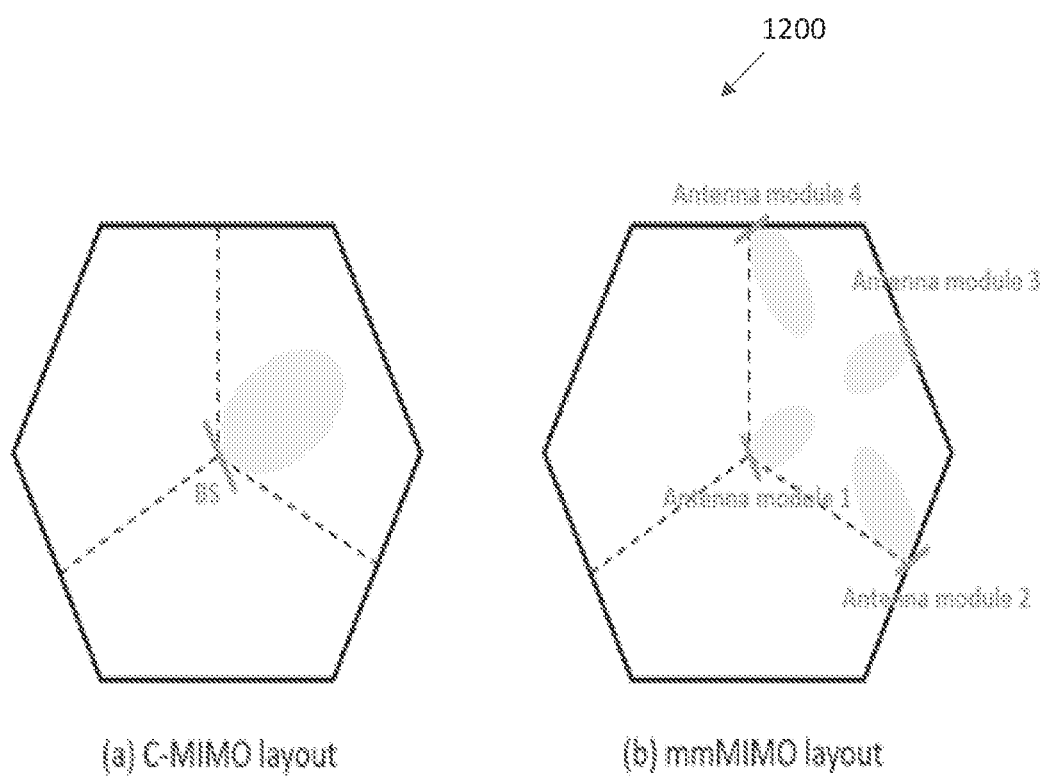
FIG. 12 illustrates layouts of (a) C-MIMO and (b) mmMIMO for SLS evaluations according to embodiments of the present disclosure.

FIG. 12 illustrates layouts of (a)C-MIMO and (b) mmMIMO for SLS evaluations 1200 according to embodiments of the present disclosure. The embodiment of the layouts 1200 is for illustration only. FIG. 12 does not limit the scope of this disclosure to any particular implementation of the layouts of (a)C-MIMO and (b) mmMIMO for SLS evaluations 1200.

To perform SLS for mmMIMO scenarios, a feasible layout for mmMIMO deployment, as shown in FIG. 12, is considered. Compared to the conventional layout for centralized MIMO (C-MIMO) as shown in FIG. 12 (a), three distributed antenna modules are additionally deployed in each sector to form an mmMIMO network in our SLS setup as shown in FIG. 12 (b). The additional three antenna modules in each sector are located at the midpoints between the centers of its associated site and neighboring sites, respectively. Each antenna module's pointing angle is facing toward the center region of the associated sector. Throughout the simulations, a structured D-MIMO setup is assumed for mmMIMO scenarios for simplicity, i.e., the same number of antenna elements per antenna module is utilized. To simulate low frequency band scenarios, the 3GPP rural macro (RMa) channel model with the center frequency of 700 MHz is adopted, where the inter-site distance is assumed to be 1.7 km. A total of 57 sectors (19 sites) in a two-tier deployment is considered and 30 UEs are randomly dropped in each sector. A non-full-buffer traffic model is assumed. Due to a low band scenario and small UE form factor relative to the wavelength of carrier frequency, only two antenna elements are assumed at each UE. Up to four layers of MU-MIMO is considered in scheduling at the BS in each sector. All simulations were performed with parameters $(2L,M,D,n_p,n_a)=(4,7,4,4,3)$ for CB1, CB2, and advanced codebook under using K=13 SBs, unless otherwise noted.

Figure 13:
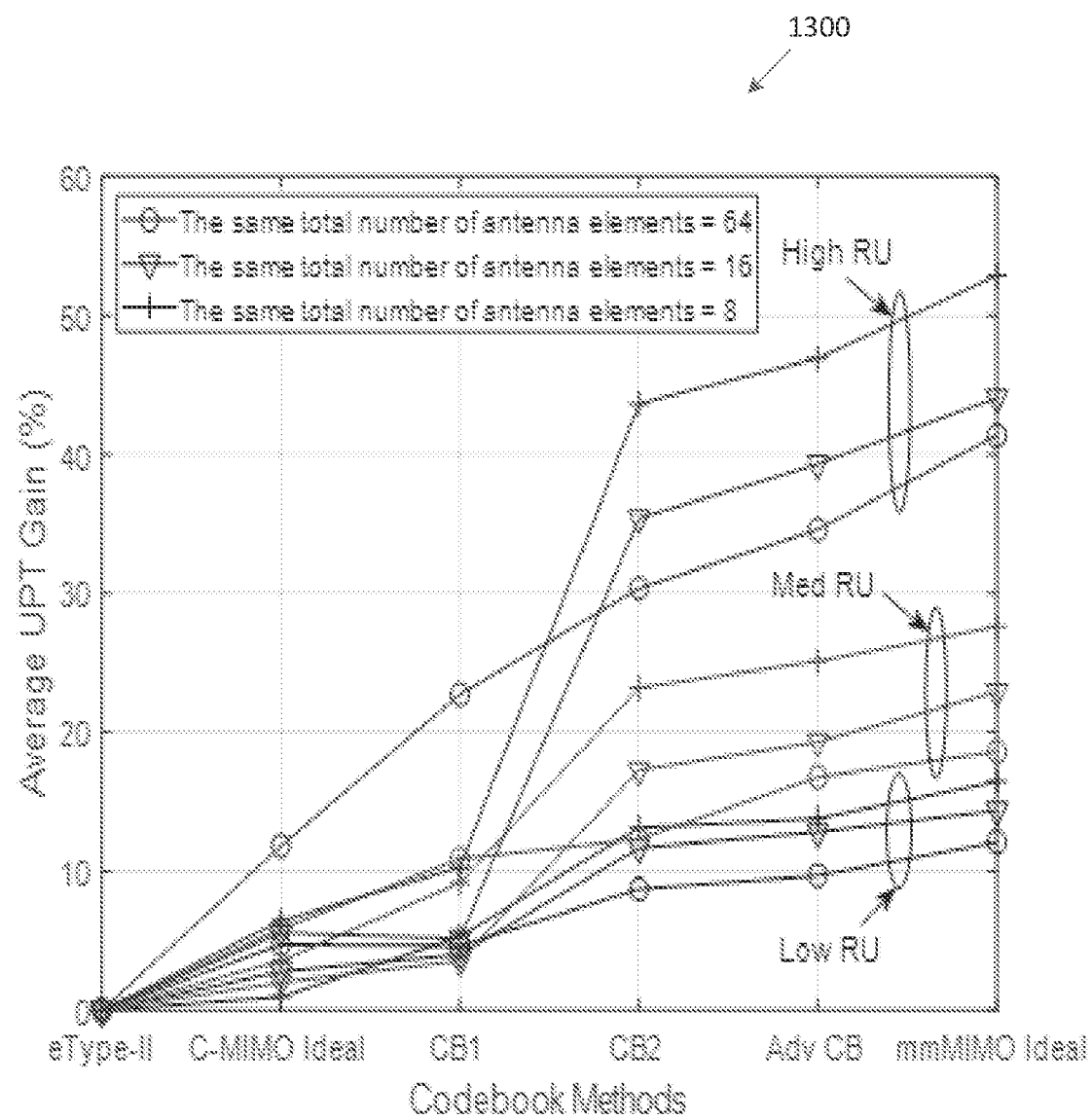
FIG. 13 illustrates average UPT gain of mmMIMO over C-MIMO according to embodiments of the present disclosure.

FIG. 13 illustrates average UPT gain of mmMIMO over C-MIMO 1300 according to embodiments of the present disclosure. The embodiment of the average UPT gain of mmMIMO over C-MIMO 1300 is for illustration only. FIG. 13 does not limit the scope of this disclosure to any particular implementation of the average UPT gain of mmMIMO over C-MIMO 1300.

To illustrate the benefit of mmMIMO, the average user perceived throughput (UPT) gains of mmMIMO with the proposed CB1, CB2, and advanced codebooks and ideal CSI are compared with that of C-MIMO with eType-II CSI and ideal CSI. FIG. 13 shows the corresponding performance result of the case that the same total number of antenna elements for C-MIMO and mmMIMO is utilized for fair comparison. In this case, we considered the three scenarios of 64, 16, and 8 antenna elements, respectively, in total for both C-MIMO and mmMIMO. For the three scenarios, via TXRU virtualization, N=32, 8, and 8 ports are utilized for C-MIMO whereas N=16, 8, and 8 ports are utilized for mmMIMO (i.e., $\bar{N}$=4, 2, and 2 ports per antenna module in mmMIMO). As shown in FIG. 13, it is validated that mmMIMO with the proposed codebooks yields significant average UPT gains over the C-MIMO up to 15%, 25%, and 47% for low resource utilization (RU), medium RU, and high RU, respectively, even in the same total number of antenna elements for C-MIMO and mmMIMO. The best gains of mmMIMO for all scenarios are achieved by the advanced codebook using the principal component analysis, and those are almost comparable to the performance of mmMIMO with ideal CSI. Additionally, it is shown that the proposed CB1 for mmMIMO, which uses eType-II CSI for each antenna module and then applies the inter-module component, yields worse performance than the proposed CB2 for mmMIMO. This is because the disjoint codebook structure of CB1 limits the quality of the CSI. Also, it is shown that the average UPT gain of mmMIMO over C-MIMO becomes decreasing as the total number of antenna elements increases. The reason is that the performance of C-MIMO and mmMIMO with a larger number of antenna elements achieves better throughputs that are closer to the performance limit determined by the modulation and coding scheme, which turns out that the average UPT gain of mmMIMO over the C-MIMO becomes reduced.

Figure 14:
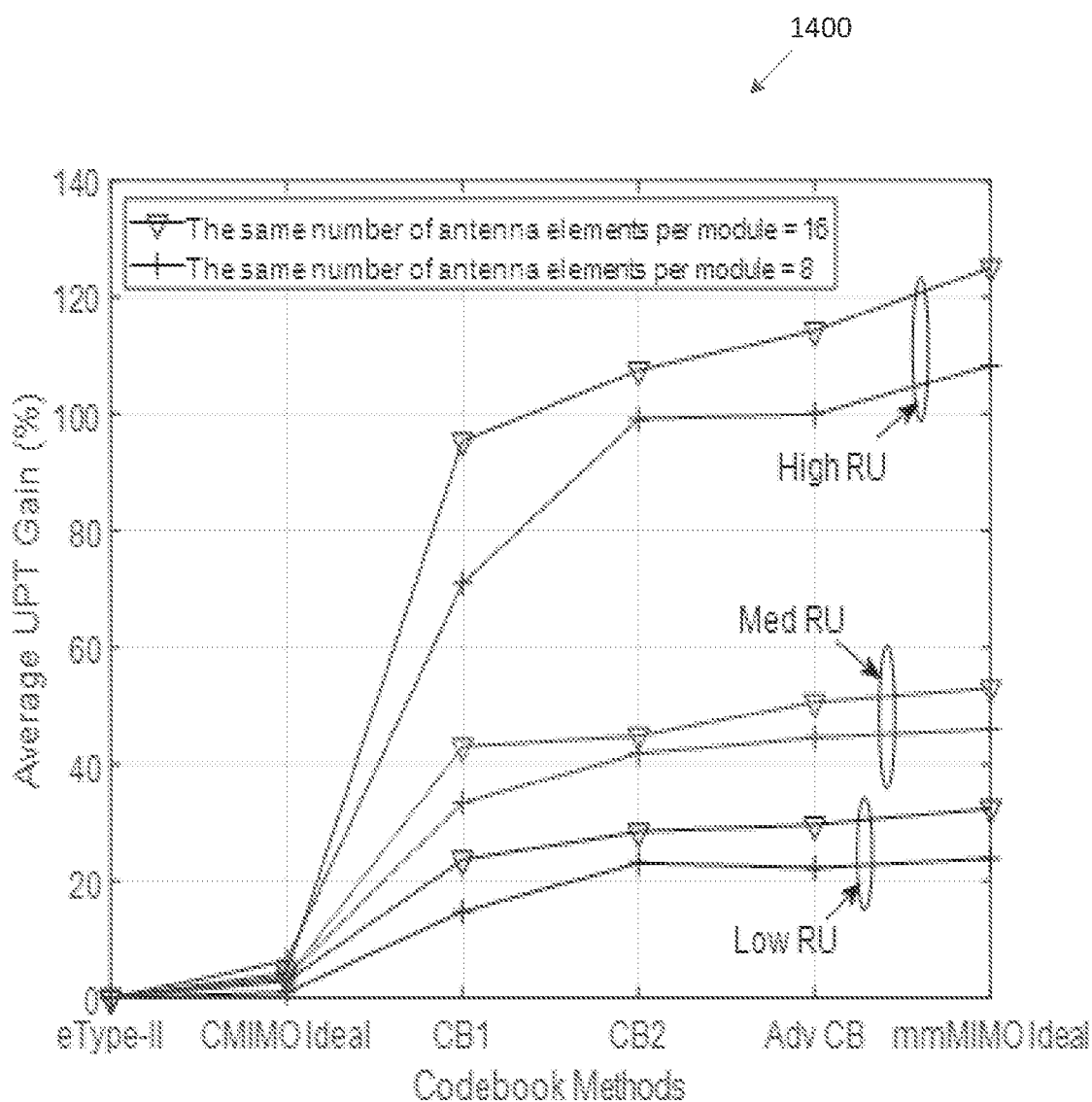
FIG. 14 illustrates average UPT gain of mmMIMO over C-MIMO 1400 according to embodiments of the present disclosure.

FIG. 14 illustrates average UPT gain of mmMIMO over C-MIMO 1400 according to embodiments of the present disclosure. The embodiment of the average UPT gain of mmMIMO over C-MIMO 1400 is for illustration only. FIG. 14 does not limit the scope of this disclosure to any particular implementation of the average UPT gain of mmMIMO over C-MIMO 1400.

FIG. 14 shows the performance result of the case that the same number of antenna elements per antenna modules for C-MIMO and mmMIMO is utilized, i.e., mmMIMO has 4 times more antenna elements than C-MIMO. In this case, we considered the two scenarios of 16 and 8 antenna elements, respectively, per antenna module for both C-MIMO and mmMIMO. In other words, 64 and 32 antenna elements in total are considered for the mmMIMO. For the two scenarios, N=16 and 8 ports are utilized for C-MIMO whereas N=16 and 16 ports are utilized for mmMIMO (i.e., $\bar{N}$=4 and 4 ports per antenna module in mmMIMO). As shown in FIG. 14, trends similar to the results shown in FIG. 13 are still observed, i.e., the average UPT gain of mmMIMO over C-MIMO becomes growing as RU increases, and the performance of the advanced codebook is superior to those of the other methods, CB1 and CB2. Also, it is shown that the mmMIMO with the proposed codebooks yields huge average UPT gains over the C-MIMO up to 32%, 53%, 125%, for low-, med-, and high-RU, respectively. This result shows that the mmMIMO with high-resolution CSI codebooks has the great potential to considerably improve the system performance in low band scenarios by overcoming the practical constraints such as the infeasibility of co-locating a large number of antenna elements at one site.

Figure 15:
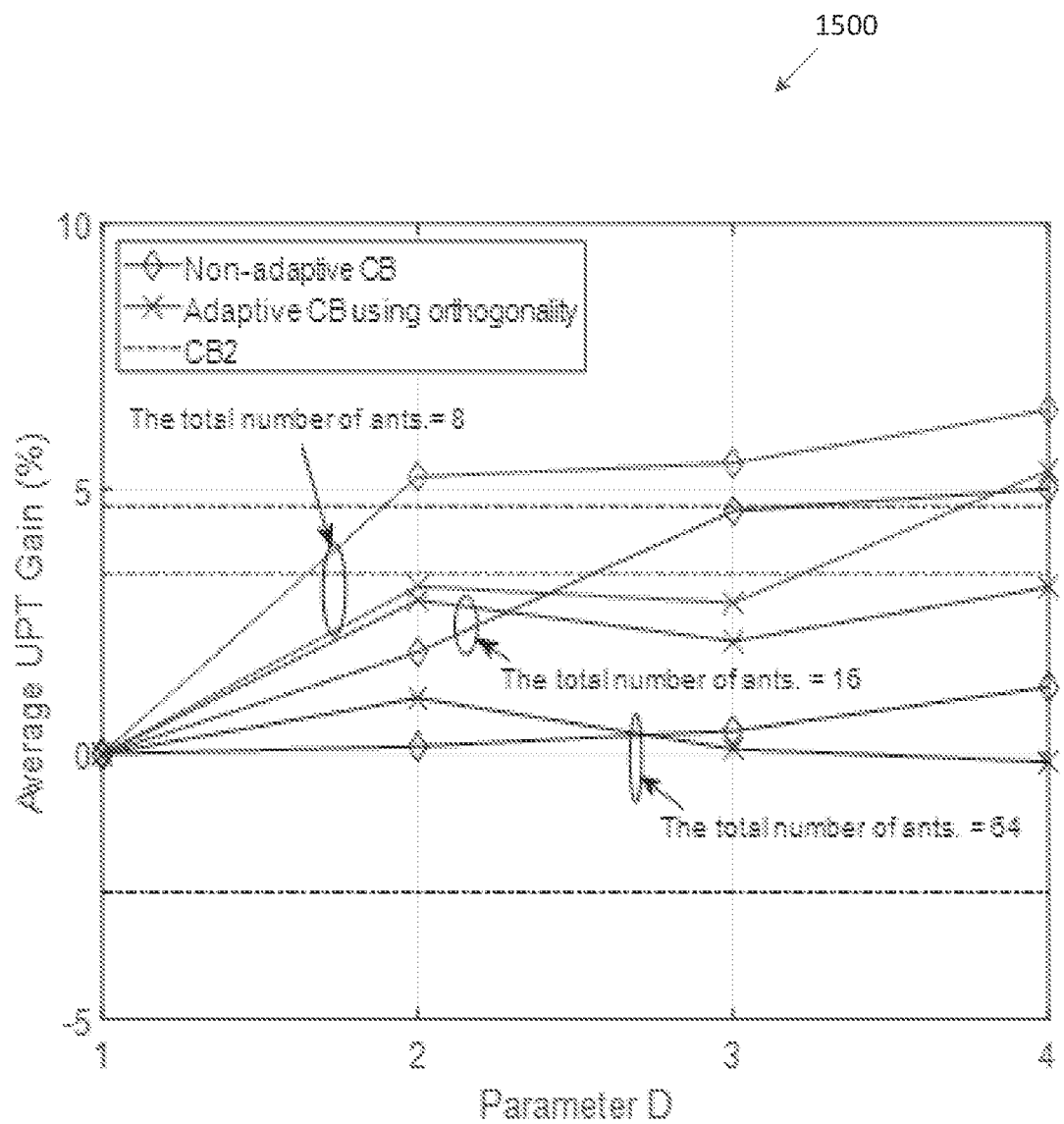
FIG. 15 illustrates a performance comparison of the advanced codebook with respect to parameter D according to embodiments of the present disclosure.

FIG. 15 illustrates a performance comparison of the advanced codebook with respect to parameter D 1500 according to embodiments of the present disclosure. The embodiment of the performance comparison of the advanced codebook with respect to parameter D 1500 is for illustration only. FIG. 15 does not limit the scope of this disclosure to any particular implementation of the performance comparison of the advanced codebook with respect to parameter D 1500.

Now, let us focus on performance evaluations for the mmMIMO with the advanced codebook. FIG. 15 shows the performance comparison of the advanced codebook with respect to the value of D, by providing the average UPT gain over the case of D=1, which corresponds to the smallest feedback overhead of the advanced codebook. The considered scenario of FIG. 15 is the same as the scenario of FIG. 13 with the medium RU for the mmMIMO. For a reference, we added the average UPT gain of CB2 over the advanced CB with D=1 for each of the three antenna configurations. Also, we consider both cases of the advanced codebooks with and without adopting the adaptive codebook using the orthogonality to identify there is any non-trivial impact on the UPT performance. As shown in FIG. 15, it is validated that the advanced codebook with a sufficient small number of D such as 1 to 4 already yields good performance that is outperformed than that of the CB2. One remarkable thing is that the advanced codebook even with D=1 can achieve better performance than that of CB2 (−2.5%) for the case of 64 antenna elements. This validates that the PCA framework of the advanced codebook can jointly and efficiently compress the channels of distributed antenna modules over the spatial and frequency domains. Additionally, it is shown that the adaptive codebook using the orthogonality has only a minor impact on the performance, i.e., most of the cases are within 1% loss compared to the case without adopting the adaptive codebook.

Figure 16:
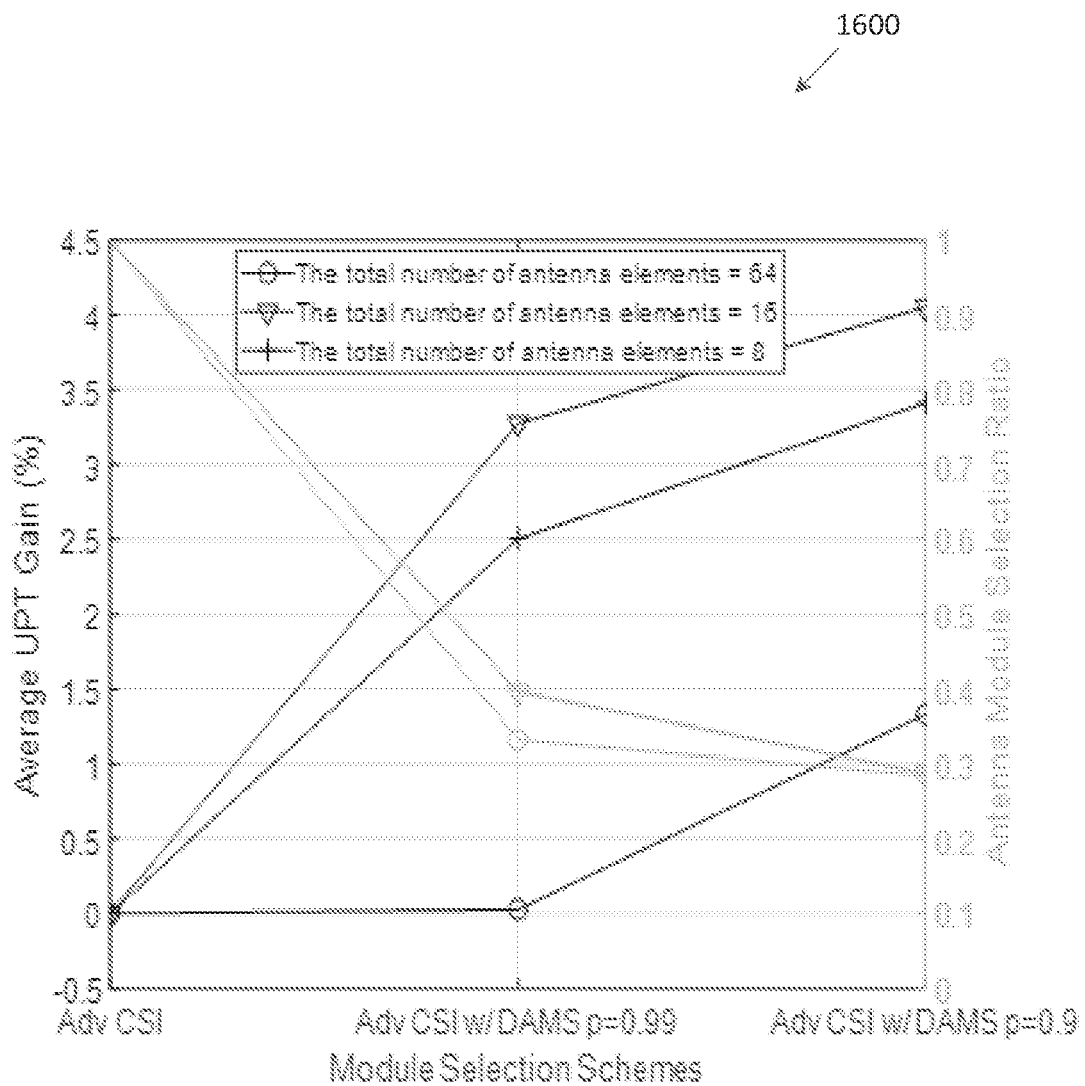
FIG. 16 illustrates a performance comparison of the advanced codebook with and without dynamic antenna module selection (DAMS) according to embodiments of the present disclosure.

FIG. 16 illustrates a performance comparison of the advanced codebook with and without dynamic antenna module selection (DAMS) 1600 according to embodiments of the present disclosure. The embodiment of the performance comparison of the advanced codebook with and without dynamic antenna module selection (DAMS) 1600 is for illustration only. FIG. 16 does not limit the scope of this disclosure to any particular implementation of the performance comparison of the advanced codebook with and without dynamic antenna module selection (DAMS) 1600.

Finally, we evaluate the performance of the advanced codebook for mmMIMO with and without adopting the feature of dynamic antenna module selection. FIG. 16 considers the same scenario as the one considered in FIG. 13 with the medium RU for the mmMIMO. For the DAMS scenario, in the simulations, the UE chooses the best antenna modules whose sum channel power occupy more than the ratio p of the total sum channel power of all antenna modules and reports the CSI corresponding to only the selected antenna modules via the advanced codebook. As shown in FIG. 16, adopting the feature of DAMS yields greater performance as well as reduces the feedback overhead as much as the antenna module selection ratio. This is because the DAMS allows the UE to report the CSI corresponding to the best antenna modules in an opportunistic manner to be able to achieve most of the desired signal power (up to the ratio p) and, at the same time, to exclude the non-dominant antenna modules, which could effectively relax undesirable interference to other cells.

As described above with reference to FIG. 9, at lower frequency bands such as <1 GHz, the number of antenna elements may not be large in a given form factor due to the large wavelength. This results in a limited number of CSI-RS ports that can be supported at a single site and limits the spectral efficiency of such systems.

One possible approach to resolving the issue is to form multiple antenna panels/RRHs with a small number of antenna ports instead of integrating all of the antenna ports in a single panel (or at a single site) and to distribute the multiple panels in multiple locations/sites (or RRHs). The multiple antenna panels at multiple locations can still be connected to a single base unit, and thus the signal transmitted/received via multiple distributed panels can be processed in a centralized manner through the single base unit. This is called distributed MIMO (D-MIMO).

However, a new issue can arise in such scenarios: as the number of antenna panels/RRHs becomes larger and many panels/RRHs can be deployed in multiple locations/sites, a huge amount of CSI feedback becomes needed to get the channels for all of the panels/RRHs in order to maximize distributed (or modularized) MIMO gains. One practical solution to handle such an issue is to support/introduce a framework to allow dynamic RRH selection. This enables UE/NW to reduce the CSI feedback overhead while obtaining most of the benefits of distributed MIMO by effectively exploiting diversity gain. Intuitively, we can expect that selecting a subset of RRHs having dominant channel qualities among all of the configured RRHs results in reasonable performance without much performance degradation, while alleviating the control data overhead (e.g., CSI reporting) significantly for both of NW and UE.

In this disclosure, in order to support efficient distributed MIMO operations, components for supporting frequency-selective dynamic RRH selection in distributed MIMO systems are proposed. Criteria for frequency-selective dynamic RRH selection, indicators for indicating/reporting selected RRHs/SBs, and CSI frameworks for generating/reporting CSI for the selected RRHs/SBs are proposed.

A UE is configured to receive DL RSs, e.g., CSI-RSs, sent from $N_{RRH}$ RRHs, and the UE is configured to perform 'frequency-selective dynamic RRH selection', wherein the UE selects a subset of RRHs in a frequency selective manner, e.g., the UE selects a subset of RRHs per SB, RB, subcarrier, or any other granularity defined based on a plurality of subcarrier/RB, and generates CSI for the subset of RRHs per SB and reports it to the NW. Hereafter, we use terminology 'SB' to denote a base granularity configured for the frequency-selective dynamic RRH selection, which can be a RB, a subcarrier, or multiple of subcarriers/RBs. We also denote the number of (configured) SBs by K.

In one embodiment, the UE is configured with a criterion or multiple criteria to select a subset of RRHs per SB in a frequency-selective manner, i.e., the selected subsets of RRHs can be different for different SBs.

In one example, $\rho \in [0,1]$ is configured to the UE and the UE performs the following frequency-selective dynamic RRH selection with p: select the $R_k$ best RRHs in the decreasing order of their RSRP/RSRQ/SINR values per SB k, where $R_k \geq 1$ is determined as the lowest positive integer such that the sum of the ordered RSRPs/RSRQs/SINRs for the $R_k$ best RRHs is greater than or equal to $\rho P_{sum,k}$, where $\rho \leq 1$ and $P_{sum,k}$ is the total sum of RSRPs/RSRQs/SINRs for all RRHs for SB k. In other words, the criterion allows the selected set of RRHs to contain the $R_k$ best RRHs per SB so that their total sum RSRP/RSRQ/SINR becomes greater than or equal to the ρ portion of the total sum of RSRPs/RSRQs/SINRs for all RRHs per SB.

Note that setting ρ=0 and 1 reduce to the best RRH selection case and all RRH selection case, respectively, whereas setting $\rho \in (0,1)$ implies in-between the best and all RRH selection cases.

In one example, p is indicated using a 2-bit or 3-bit indicator. For example, ρ is selected from {0, 0.9, 0.95, 1} or {0, 0.5, 0.7, 0.8, 0.9, 0.95, 0.99, 1}. In another example, ρ is pre-determined, e.g., ρ=0.9.

In one example, ρ is configured/indicated by NW via DCI/MAC-CE or higher-layer signalling, i.e., RRC.

In one example, ΔX is configured to the UE and the UE performs the following frequency-selective dynamic RRH selection with ΔX: first select the best RRH per SB k and then select all other RRHs whose RSRPs/RSRQs/SINRs are within ΔX from the best RRH's RSRP/RSRQ/SINR per SB k.

In one example, ΔX is indicated using a 1-bit, 2-bit, or 3-bit indicator. For example, ΔX is selected from {1.5 dB, 3 dB}, {3 dB, 6 dB, 9 dB, 12 dB}, or {1.5 dB, 3 dB, 4.5 dB, 6 dB, 7.5 dB, 9 dB, 10.5 dB, 12 dB}. In another example, ΔX is pre-determined, e.g., ΔX=3 dB, and in this case no indication is needed.

In one example, ΔX is configured/indicated by NW via DCI/MAC-CE or higher-layer signalling, i.e., RRC.

In one example, $X_{TH}$ is configured to the UE and the UE performs the following frequency-selective dynamic RRH selection with $X_{TH}$: select all the RRHs whose CQIs/RSRPs/RSRQs/SINRs are greater than or equal to the configured $X_{TH}$ per SB k.

In one example, $X_{TH}$ is a value of CQI and is configured by NW. In one example, $X_{TH}=2$. In another example, an RSRP/RSRQ/SINR value for $X_{TH}$ can be configured by NW using an RSRP/RSRQ/SINR indicator wherein each value corresponds to a range of RSRP/RSRQ/SINR or an RSRP/RSRQ/SINR. In another example, $X_{TH}$ is predetermined.

In one example, $X_{TH}$ is configured/indicated by NW via DCI/MAC-CE or higher-layer signalling, i.e., RRC.

In one example, the UE selects a subset of RRHs, denoted by $S_{WB}$, in a WB manner using a first criterion and selects a sub-subset of RRHs among the RRHs in $S_{WB}$ per SB k using a second criterion.

In one example, $X_{TH}$ and ρ are configured to the UE and the UE performs the following frequency-selective dynamic RRH selection with $X_{TH}$ and ρ: 1) obtain $S_{WB}$ by selecting the RRHs whose CQIs/RSRPs/RSRQs/SINRs (computed based on all SBs, i.e., WB-wise) are greater than or equal to the configured $X_{TH}$, and 2) select the $R_k$ best RRHs in the decreasing order of their RSRP/RSRQ/SINR values per SB k among the selected RRHs in $S_{WB}$, where $R_k \geq 1$ is determined as the lowest positive integer such that the sum of the ordered RSRPs/RSRQs/SINRs for the $R_k$ best RRHs is greater than or equal to $\rho P_{sum,k}$ ($S_{WB}$), where $\rho \leq 1$ and $P_{sum,k}(S_{WB})$ is the total sum of RSRPs/RSRQs/SINRs for the selected RRHs in $S_{WB}$ for SB k.

In one example, $X_{TH}$ and ΔX are configured to the UE and the UE performs the following frequency-selective dynamic RRH selection with $X_{TH}$ and ΔX: 1) obtain $S_{WB}$ by selecting the RRHs whose CQIs/RSRPs/RSRQs/SINRs (computed based on all SBs, i.e., WB-wise) are greater than or equal to the configured $X_{TH}$, and 2) select the best RRH among the selected RRHs in $S_{WB}$ per SB k and then select all other RRHs in $S_{WB}$ whose RSRPs/RSRQs/SINRs are within ΔX from the best RRH's RSRP/RSRQ/SINR per SB k.

In one example, frequency selective dynamic RRH selection is performed in a layer-specific manner, i.e., for each layer, the UE performs frequency-selective dynamic RRH selection independently.

In one example, a same criterion or a same set of criteria is configured to UE and the UE performs frequency-selective dynamic RRH selection independently for each layer, using the same configured criterion/criteria. For example, one of the above criteria described in the examples above is configured to the UE, and the UE performs frequency dynamic RRH selection independently for each layer according to the configured criterion/criteria.

In one example, a different criterion or a different set of criteria for a different layer is configured to the UE, and the UE performs frequency selective dynamic RRH selection using the configured criterion/criteria corresponding to the layer. In one example, for a two-layer case, the UE is configured to perform frequency selective dynamic RRH selection for a first layer according to one or more examples described above and for a second layer according to one or more examples described above.

In one example, frequency selective dynamic RRH selection is performed in a layer-common manner, i.e., the UE performs frequency-selective dynamic RRH selection commonly for all layers. For example, one of the above criteria described in one or more examples described above is configured to the UE, and the UE performs frequency dynamic RRH selection commonly for all layers according to the configured criterion/criteria.

In one embodiment, the UE reports information on a selected set of SBs/RRHs using one or more indicator(s). We hereafter denote the selected set of SBs for each RRH g by $S_{SB}(g)$, and the selected set of RRHs for each SB k by $S_{RRH}(k)$, respectively.

In one example, a bit-map indicator is used to indicate a selected set of SBs/RRHs. In one example, a 2-D bit-map indicator can be used wherein the first dimension is for RRH indices and the second dimension is for SB indices. For example, '0' in a (RRH, SB) pair of a 2-D map indicator indicates that the corresponding RRH and SB is not selected, '1' in a (RRH, SB) pair of a 2-D map indicator indicates that the corresponding RRH and SB pair is selected.

In one example, an indicator is used to indicate indices for a selected set of SBs for each RRH. For example, the number of selected SBs $|S_{SB}(g)|$ for each RRH g is reported and a $$\left\lceil \log_2 \binom{K}{|S_{SB}(g)|} \right\rceil -$$

bit indicator is used to indicate indices of the selected SBs for each RRH g, where K is the number of (configured) SBs.

In one example, an indicator is used to indicate indices for a selected set of RRHs for each SB. For example, the number of selected RRHs $|S_{RRH}(k)|$ for each SB k is reported and a $$\left\lceil \log_2 \binom{N_{RRH}}{|S_{RRH}(k)|} \right\rceil -$$

bit indicator is used to indicate indices of the selected RRHs for each SB k, where $N_{RRH}$ is the number of RRHs.

In one example, a two-stage indicator is used to indicate a selected set of SBs/RRHs, wherein the first-stage indicator is used to indicate a set of selected RRHs $S_{WB}$ in a WB manner, and the second-stage indicator is used to indicate selected SBs for each RRH $g \in S_{WB}$.

In one example, the first-stage indicator is a bit-map indicator to indicate selected RRHs ($S_{WB}$) in a WB manner, and the second-stage indicator is a (2D) bit-map indicator to indicate selected SBs for each RRH in $S_{WB}$.

In one example, the first-stage indicator is an indicator to indicate indices for selected RRHs ($S_{WB}$) in a WB manner, and the second-stage indicator is a (2D) bit-map indicator to indicate selected SBs for each RRH in $S_{WB}$. For example, for the first-stage indicator, a $$\left\lceil \log_2 \binom{N_{RRH}}{|S_{WB}|} \right\rceil -$$

bit indicator is used to indicate indices of the selected RRHs of $S_{WB}$ along with the number of selected RRHs $|S_{WB}|$.

In one example, the first-stage indicator is an indicator to indicate indices for selected RRHs ($S_{WB}$) in a WB manner, and the second-stage indicator is an indicator to indicate indices for selected SBs for each RRH $g \in S_{WB}$. For example, for the first-stage indicator, a $$\left\lceil \log_2 \binom{N_{RRH}}{|S_{WB}|} \right\rceil -$$

bit indicator is used to indicate indices of the selected RRHs of $S_{WB}$ along with the number of selected RRHs $|S_{WB}|$, and for the second-stage indicator, a $$\left\lceil \log_2 \binom{K}{|S_{SB}(g)|} \right\rceil -$$

bit indicator is used to indicate indices of the selected SBs along with the number of selected SBs $|S_{SB}(g)|$ for each RRH $g \in S_{WB}$.

In one example, the first-stage indicator is a bit-map indicator to indicate selected RRHs ($S_{WB}$) in a WB manner, and the second-stage indicator is an indicator to indicate indices for selected SBs for each RRH $g \in S_{WB}$. For example, for the second-stage indicator, a $$\left\lceil \log_2 \binom{K}{|S_{SB}(g)|} \right\rceil -$$

bit indicator is used to indicate indices of the selected SBs along with the number of selected SBs $|S_{SB}(g)|$ for each RRH $g \in S_{WB}$.

In one example, a two-stage indicator is used to indicate a selected set of SBs/RRHs, wherein the first-stage indicator is used to indicate a set of selected RRHs $S_{WB}$ in a WB manner, and the second-stage indicator is used to indicate a selected subset of RRHs $S_{RRH}(k) \subset S_{WB}$ for each SB k.

In one example, the first-stage indicator is a bit-map indicator to indicate selected RRHs ($S_{WB}$) in a WB manner, and the second-stage indicator is an indicator to indicate indices for a selected subset of RRHs $S_{RRH}(k) \subset S_{WB}$ for each SB k. For example, for the second-stage indicator, a $$\left\lceil \log_2\left(\frac{|S_{WB}|}{|S_{RRH}(k)|}\right)\right\rceil-$$

bit indicator is used to indicate indices of the selected subset of RRHs along with the number of selected RRHs $|S_{RRH}(k)|$ for each SB k.

In one example, the first-stage indicator is an indicator to indicate indices for selected RRHs ($S_{WB}$) in a WB manner, and the second-stage indicator is an indicator to indicate indices for a selected subset of RRHs $S_{RRH}(k) \subset S_{WB}$ for each SB k. For example, for the first-stage indicator, a $$\left\lceil \log_2\left(\frac{N_{RRH}}{|S_{WB}|}\right)\right\rceil-$$

bit indicator is used to indicate indices of the selected set of RRHs ($S_{WB}$) in a WB manner along with the number of selected RRHs $|S_{WB}|$, and for the second-stage indicator, a $$\left\lceil \log_2\left(\frac{|S_{WB}|}{|S_{RRH}(k)|}\right)\right\rceil-$$

bit indicator is used to indicate indices of the selected subset of RRHs $S_{RRH}(k) \subset S_{WB}$ along with the number of selected RRHs $|S_{RRH}(k)|$ for each SB k.

In one embodiment, the UE generates CSI for selected SBs/RRHs based on a CSI codebook and reports the CSI to the NW. The CSI codebook for the selected SBs/RRHs has two components: 1) a triple-stage precoder structure for the CSI corresponding to the set of selected SBs $S_{SB}(g)$ for each RRH g (for each layer), and 2) an inter-RRH component for the set of selected RRHs $S_{RRH}(k)$ for each SB k (for each layer).

Note that the size of the precoder matrix corresponding to the set of selected SBs $S_{SB}(g)$ for each RRH g (for a given layer) is an $N_g \times |S_{SB}(g)|$, where $N_g$ is the number of antenna ports at RRH g.

In one embodiment, the triple-stage precoder structure for the CSI corresponding to the set of selected SBs $S_{SB}(g)$ for each RRH g can be represented as $W_g = W_{1,g} W_{2,g} W_{f,g}^H$, where the component $W_{1,g}$ is used to report/indicate a spatial domain (SD) basis matrix comprising SD basis vectors, the component $W_{f,g}$ is used to report/indicate a frequency domain (FD) basis matrix comprising FD basis vectors, and the component $W_{2,g}$ is used to report/indicate coefficients corresponding to SD and FD basis vector pairs for RRH g.

The SD/FD basis vectors are selected from 2D and 1D DFT codebooks, respectively, which are designed similar to the 2D and 1D DFT codebooks used in the Rel-16 Type-II CSI.

In one example, when RRH g has a single-panel with co-polarized (single-polarized) antenna ports, $W_{1,g} = B_g$, where $B_g = [b_0, \ldots, b_{L-1}]$ comprises L SD basis beam vectors.

In one example, when RRH g has a single-panel with dual-polarized antenna ports, $$W_{1,g} = \begin{bmatrix} B_g & 0 \\ 0 & B_g \end{bmatrix}, \text{ where } B_g = [b_0, \ldots, b_{L-1}]$$

comprises L SD basis beam vectors.

In one example, when RRH g has multi-panel with co-polarized (single-polarized) antenna ports, $W_{1,g}=\text{diag}[B_{g,1}, B_{g,2}, \ldots, B_{g,P}]$ where P is the number of panels at RRH g, and $B_{g,p}=[b_0, \ldots, b_{L_p-1}]$ comprises $L_p$ SD basis beam vectors for panel p at RRH g. In one example, $L_p=L$, i.e., the same for all panels.

In one example, when RRH g has multi-panel with dual-polarized antenna ports, $W_{1,g}=\text{diag}[B_{g,1}, B_{g,1}, B_{g,2}, B_{g,2}, \ldots, B_{g,P}, B_{g,P}]$ where P is the number of panels at RRH g, and $B_{g,p}=[b_0, \ldots, b_{L_p-1}]$ comprises $L_p$ SD basis beam vectors for panel p at RRH g. In one example, $L_p=L$, i.e., the same for all panels.

In one example, when RRH g has multi-panel with co-polarized antenna ports and multi-panel with dual-polarized antenna ports, $W_{1,g}=\text{diag}[B_{g,1}, B_{g,2}, \ldots, B_{g,P_1}, B_{g,P_1+1}, B_{g,P_q+1}, B_{g,P_1+2}, B_{g,P_1+2}, \ldots, B_{g,P_1+P_2}, B_{g,P_1+P_2}]$ where $P_1$ and $P_2$ are the numbers of panels associated with co-polarized antenna ports and dual-polarized antenna ports, respectively, at RRH g, and $B_{g,p}=[b_0, \ldots, b_{L_p-1}]$ comprises $L_p$ SD basis beam vectors for panel p at RRH g. In one example, $L_p=L$, i.e., the same for all panels.

In one example, the size of SD basis matrix $W_{1,g}$ does not depend on the size of the set of selected SBs $|S_{SB}(g)|$.

In one example, the size of SD basis matrix $W_{1,g}$ depends on the size of the set of selected SBs $|S_{SB}(g)|$. In this case, $L_p=L_p(|S_{SB}(g)|)$ or $L=L(|S_{SB}(g)|)$, i.e., L is determined as a function of $|S_{SB}(g)|$. In one example, L(x) is a non-increasing function of x.

In one example, $W_{f,g}=[f_0, f_1, \ldots, f_{M_v-1}]$, where $M_v$ is the number of FD beam vectors for a given layer v. In one example, $M_v$ is layer-common, i.e., $M_v=M$ for all layers.

In one example, the size of FD basis matrix $W_{f,g}$ depends on the size of the set of selected SBs $|S_{SB}(g)|$.

In one example, $M_v$ is determined as a function of $|S_{SB}(g)|$. For example, $M_v=\lceil a_v \times |S_{SB}(g)| \rceil$ where $a_v \leq 1$.

In one example, $a_v$ is layer-common, i.e., $a_v=a$ for all layers.

In one example, $a_v$ is indicated via 2-bit or 3-bit indicator. For example, $a_v$ is selected from $$\left\{\frac{2}{3}, \frac{1}{2}, \frac{1}{3}, \frac{1}{4}\right\}.$$

In one example, the coefficient matrix $W_{2,g}$ is designed similar to Rel-16 Type-II CSI.

In embodiment, the inter-RRH component q (coefficient) for the set of selected RRHs $S_{RRH}(k)$ for each SB k is decomposed into inter-RRH phase and inter-RRH amplitude components, and these are selected from respective codebooks and reported. For example, the inter-RRH phase component is selected from X-PSK codebook ($\log_2$ X-bit indicator), where X=3 or 4, and the inter-RRH amplitude component is selected from n-bit amplitude codebook composed of equidistant points in [0,1] in c dB scale. For example, for n=3 and c=1, the codebook could be $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

In one example, for SB k where $|S_{RRH}(k)|=1$, (i.e., one RRH is selected for SB k) no inter-RRH component is reported.

In one example, for SB k where $|S_{RRH}(k)|>1$, (i.e., more than one RRH are selected for SB k), the inter-RRH components are normalized by the strongest inter-RRH component, and thus no reported is needed for the strongest inter-RRH component. An indicator is used to indicate the strongest inter-RRH component for the SB k.

Figure 17:
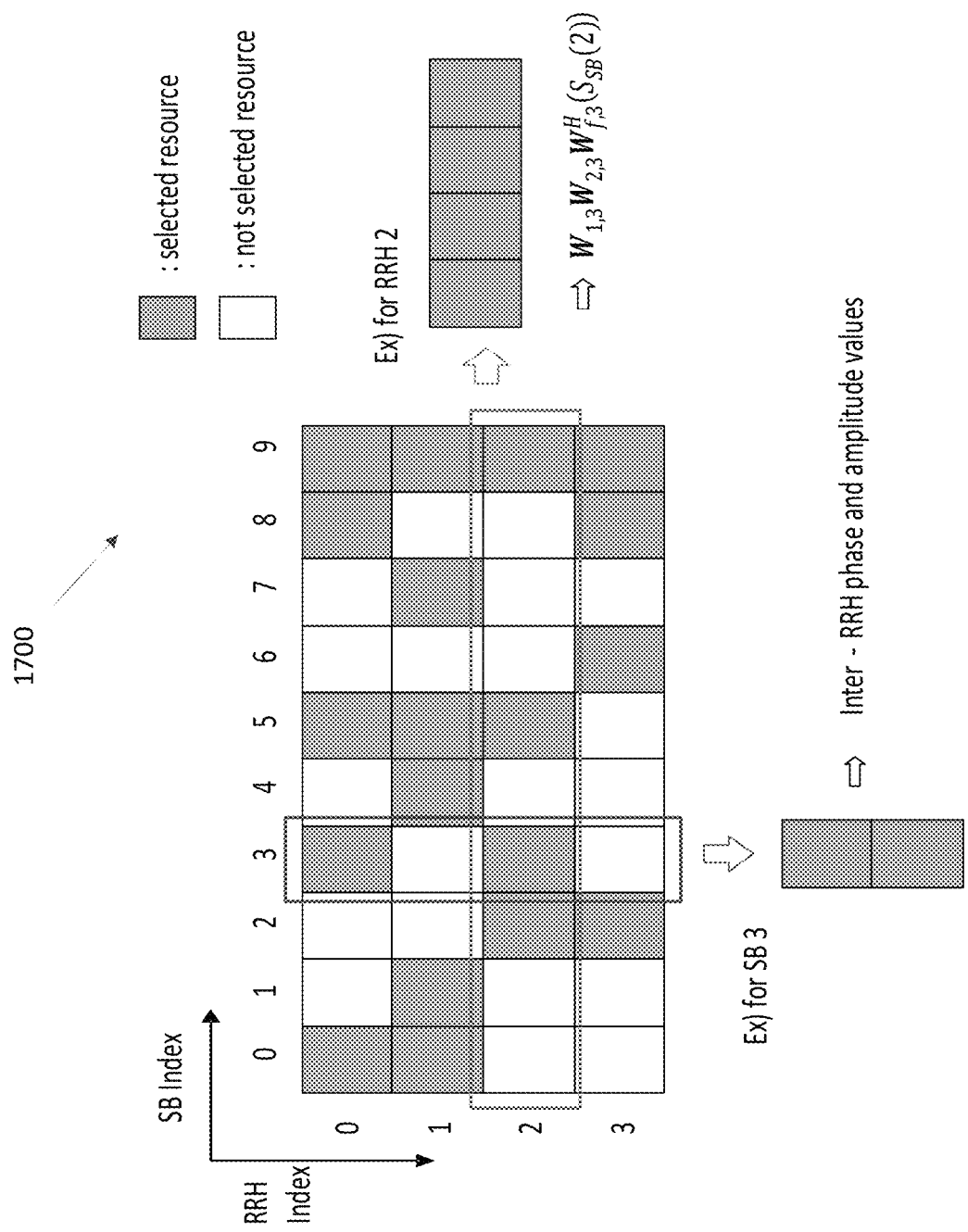
FIG. 17 illustrates CSI for frequency selective dynamic RRH selection performed by the UE according to embodiments of the present disclosure.

FIG. 17 illustrates CSI for frequency selective dynamic RRH selection performed by the UE 1700 according to embodiments of the present disclosure. The embodiment of the CSI for frequency selective dynamic RRH selection performed by the UE 1700 is for illustration only. FIG. 17 does not limit the scope of this disclosure to any particular implementation of the CSI for frequency selective dynamic RRH selection performed by the UE 1700.

FIG. 17 shows an overall description to generate CSI for the selected set of SB s/RRHs.

In one embodiment, the UE generates/reports SINR which is computed based on selected RRHs $S_{RRH}(k)$ and unselected RRHs $S_{RRH}^c(k)$ for SB k. For example, the SINR for SB k can be computed as follows:

$$\frac{\Sigma_{i \in S_{RRH}(k)} P_i}{\Sigma_{j \in S_{RRH}^c(k)} P_j + I + N},$$

where $P_i$ is the signal power for RRH i. Note that the SINR computation depends on the RRH selection performed by UE (not by NW), i.e., the numerator term has the sum of the signal powers for the selected RRHs and the denominator term is the sum of the signal powers (interference powers) for the unselected RRHs, other interference power I, and the noise power N.

Figure 18:
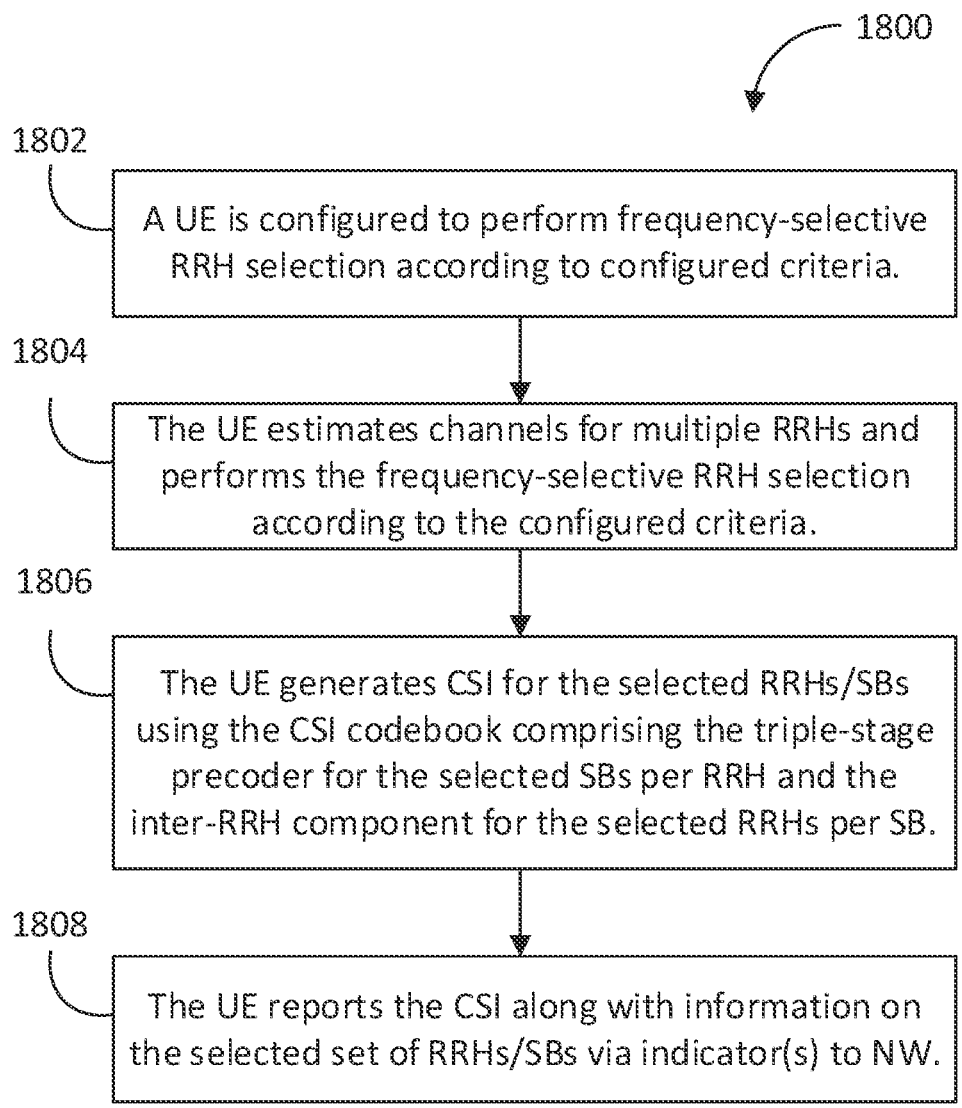
FIG. 18 illustrates a flow chart of frequency-selective RRH selection operations at the UE according to embodiments of the present disclosure.

FIG. 18 illustrates a flow chart of frequency-selective RRH selection operations at the UE 1800 according to embodiments of the present disclosure. The embodiment of the flow chart of frequency-selective RRH selection operations at the UE 1800 is for illustration only. FIG. 18 does not limit the scope of this disclosure to any particular implementation of the flow chart of frequency-selective RRH selection operations at the UE 1800.

FIG. 18 illustrates a flow chart that describes overall operations of frequency-selective dynamic RRH selection at the UE.

At step 1802, a UE performs frequency-selective RRH selection according to configured criteria.

At step 1804, the UE estimates channels for multiple RRHs and performs the frequency-selective RRH selection according to the configured criteria.

At step 1806, the UE generates CSI for the selected RRHs/SB s using the CSI codebook comprising the triple-stage precoder for the selected SB s per RRH and the inter-RRH component for the selected RRHs per SB.

At step 1808, the UE reports the CSI along with information on the selected set of RRHs/SB s via indicator(s) to NW.

In one example, a UE has channel estimates for multiple RRHs based on measurements at time $t_1$, and an AI engine at the UE predicts future channels for a subset of the RRHs at time $t_2$ ($>t_1$) based on the previous measurements and other information such as UE location, speed, trajectory, etc., and the UE preforms the frequency-selective RRH selection according to the configured criteria, based on the predicted channels. The UE generates CSI for the selected RRHs/SB s using the CSI codebook comprising the triple-stage precoder for the selected SB s per RRH and the inter-RRH component for the selected RRHs per SB. The UE reports the CSI along with information on the selected set of RRHs/SBs via indicator(s) to NW.

Any of the above variation embodiments can be utilized independently or in combination with at least one other variation embodiment.

Figure 19:
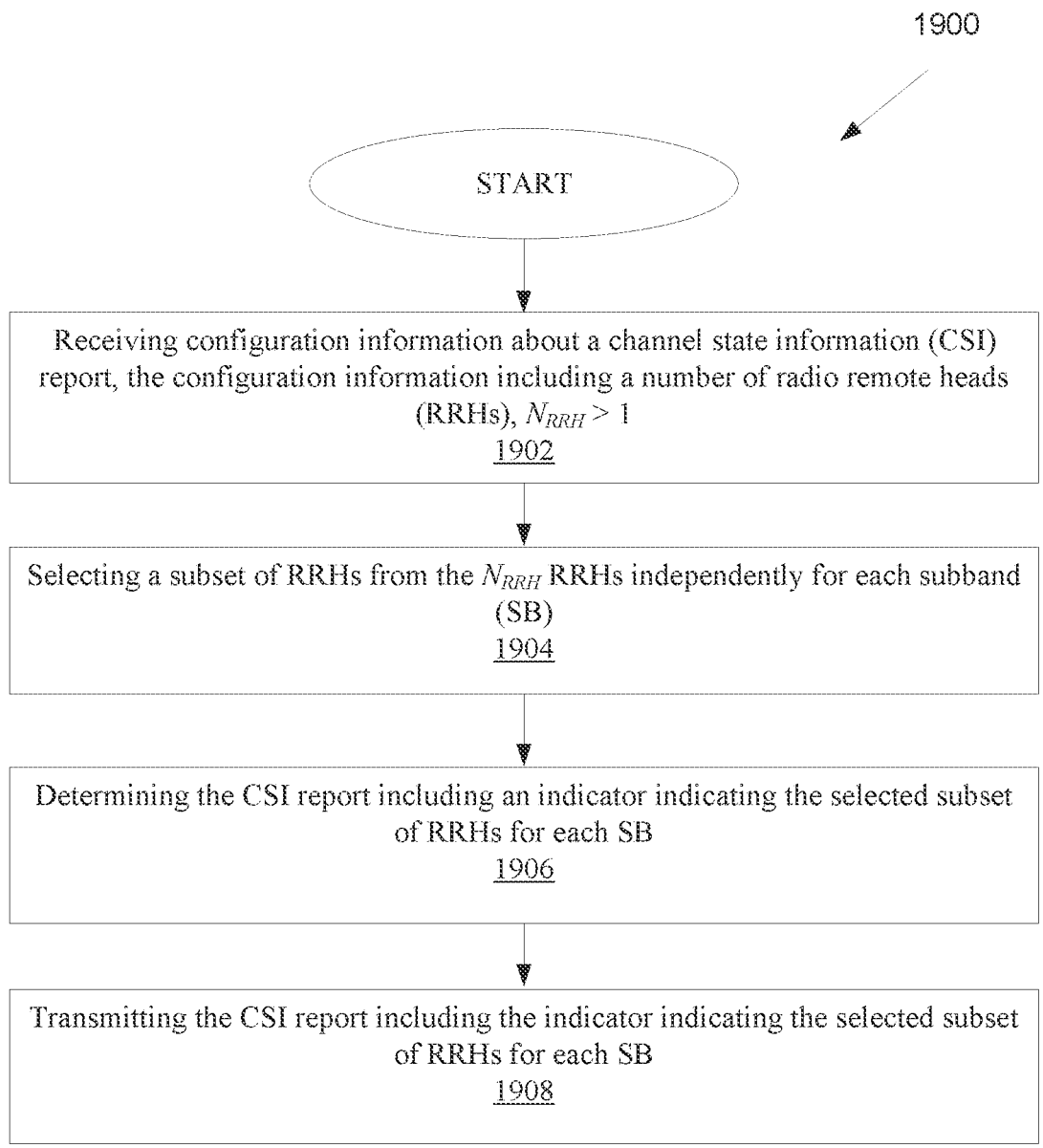
FIG. 19 illustrates a flow chart of a method for operating a UE according to embodiments of the present disclosure.

FIG. 19 illustrates a flow chart of a method 1900 for operating a user equipment (UE), as may be performed by a UE such as UE 116, according to embodiments of the present disclosure. The embodiment of the method 1900 illustrated in FIG. 19 is for illustration only. FIG. 17 does not limit the scope of this disclosure to any particular implementation.

As illustrated in FIG. 19, the method 1900 begins at step 1902. In step 1902, the UE (e.g., 111-116 as illustrated in FIG. 1) receives configuration information about a channel state information (CSI) report, the configuration information including a number of radio remote heads (RRHs), $N_{RRH} > 1$.

In step 1904, the UE selects a subset of RRHs from the $N_{RRH}$ RRHs independently for each subband (SB).

In step 1906, the UE determines the CSI report including an indicator indicating the selected subset of RRHs for each SB.

In step 1908, the UE transmits the CSI report including the indicator indicating the selected subset of RRHs for each SB.

In one embodiment, the indicator is determined based on RRH selection of $|S_{RRH}(k)|$ out of $N_{RRH}$ RRHs, for each SB k, and the CSI report is determined for the selected $|S_{RRH}(k)|$ RRHs for each SB k.

In one embodiment, the indicator is of length $N_{RRH}$ bits for each SB k, or the indicator is of length $$\left\lceil \log_2 \binom{N_{RRH}}{|S_{RRH}(k)|} \right\rceil$$

bits for each SB k, where $\lceil \ \rceil$ is a ceiling function.

In one embodiment, the indicator indicates an SB selection of $|S_{SB}(g)|$ out of K SBs for each RRH g, and the CSI report is determined for the selected $|S_{SB}(g)|$ SBs for each RRH g.

In one embodiment, the indicator is of length K bits for each RRH g, or the indicator is of length $$\left\lceil \log_2 \binom{K}{|S_{SB}(g)|} \right\rceil$$

bits for each RRH g, where $\lceil \ \rceil$ is a ceiling function.

In one embodiment, the indicator is a two-stage indicator, a first-stage indicator indicates a set of selected RRHs $S_{WB}$ in a wideband (WB) manner, for all SBs, and a second-stage indicator indicates selected $|S_{SB}(g)|$ SBs for each RRH $g \in S_{WB}$.

In one embodiment, the indicator is a two-stage indicator, a first-stage indicator indicates a set of selected RRHs $S_{WB}$ in a wideband (WB) manner, for all SBs, and a second-stage indicator indicates selected RRHs $S_{RRH}(k) \subset S_{WB}$ for each SB k.

In one embodiment, the CSI report includes a precoding matrix indicator (PMI) indicating spatial domain (SD) basis vectors, frequency domain (FD) basis vectors, and coefficients for (SD,FD) basis vector pairs, for a selected subset of SBs $S_{SB}(g)$ for a selected RRH g, and for SB k when $|S_{RRH}(k)| > 1$, the CSI report further includes inter-RRH amplitude and phase components.

Figure 20:
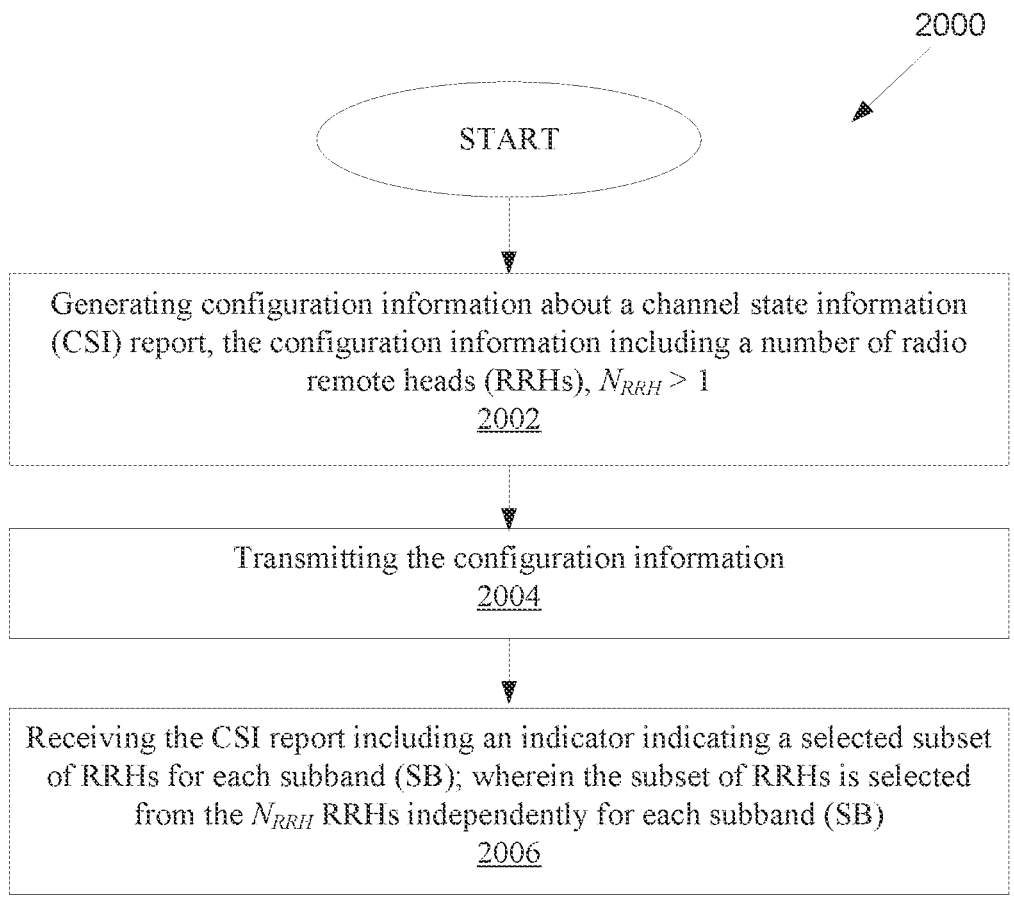
FIG. 20 illustrates a flow chart of a method for operating a BS according to embodiments of the present disclosure.

FIG. 20 illustrates a flow chart of another method 2000, as may be performed by a base station (BS) such as BS 102, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the BS (e.g., 101-103 as illustrated in FIG. 1), generates configuration information about a channel state information (CSI) report, the configuration information including a number of radio remote heads (RRHs), $N_{RRH} > 1$.

In step 2004, the BS transmits the configuration information.

In step 2006, the BS receives the CSI report including an indicator indicating a selected subset of RRHs for each subband (SB); wherein the subset of RRHs is selected from the $N_{RRH}$ RRHs independently for each subband (SB).

In one embodiment, the indicator is based on RRH selection of $|S_{RRH}(k)|$ out of $N_{RRH}$ RRHs, for each SB k, and the CSI report is based on the selected $|S_{RRH}(k)|$ RRHs for each SB k.

In one embodiment, the indicator is of length $N_{RRH}$ bits for each SB k, or the indicator is of length $$\left\lceil \log_2 \binom{N_{RRH}}{|S_{RRH}(k)|} \right\rceil$$

bits for each SB k, where ⌈ ⌉ is a ceiling function.

In one embodiment, the indicator indicates an SB selection of $|S_{SB}(g)|$ out of K SBs for each RRH g, and the CSI report is based on the selected $|S_{SB}(g)|$ SBs for each RRH g.

In one embodiment, the indicator is of length K bits for each RRH g, or the indicator is of length $$\left\lceil \log_2 \binom{K}{|S_{SB}(g)|} \right\rceil$$

bits for each RRH g, where ⌈ ⌉ is a ceiling function.

In one embodiment, the indicator is a two-stage indicator, a first-stage indicator indicates a set of selected RRHs $S_{WB}$ in a wideband (WB) manner, for all SBs, and a second-stage indicator indicates selected $|S_{SB}(g)|$ SBs for each RRH $g \in S_{WB}$.

In one embodiment, the indicator is a two-stage indicator, a first-stage indicator indicates a set of selected RRHs $S_{WB}$ in a wideband (WB) manner, for all SBs, and a second-stage indicator indicates selected RRHs $S_{RRH}(k) \subset S_{WB}$ for each SB k.

In one embodiment, the CSI report includes a precoding matrix indicator (PMI) indicating spatial domain (SD) basis vectors, frequency domain (FD) basis vectors, and coefficients for (SD,FD) basis vector pairs, for a selected subset of SBs $S_{SB}(g)$ for a selected RRH g, and for SB k when $|S_{RRH}(k)| > 1$, the CSI report further includes inter-RRH amplitude and phase components.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive configuration information about a channel state information (CSI) report, the configuration information including a number of radio remote heads (RRHs), $N_{RRH} > 1$; and
a processor operably coupled to the transceiver, the processor configured, based on the configuration information, to:
select a subset of RRHs from the $N_{RRH}$ RRHs independently for each subband (SB), and
determine the CSI report including an indicator indicating the selected subset of RRHs for each SB;
wherein the transceiver is further configured to transmit the CSI report including the indicator indicating the selected subset of RRHs for each SB.

2. The UE of claim 1, wherein the indicator is determined based on RRH selection of $|S_{RRH}(k)|$ out of $N_{RRH}$ RRHs, for each SB k, and the CSI report is determined for the selected $|S_{RRH}(k)|$ RRHs for each SB k.

3. The UE of claim 2, wherein:
the indicator is of length $N_{RRH}$ bits for each SB k, or the indicator is of length $$\left\lceil \log_2 \binom{N_{RRH}}{|S_{RRH}(k)|} \right\rceil$$

bits for each SB k, where ⌈ ⌉ is a ceiling function.

4. The UE of claim 1, wherein the indicator indicates an SB selection of $|S_{SB}(g)|$ out of K SBs for each RRH g, and the CSI report is determined for the selected $|S_{SB}(g)|$ SBs for each RRH g.

5. The UE of claim 4, wherein:
the indicator is of length K bits for each RRH g, or the indicator is of length $$\left\lceil \log_2 \binom{K}{|S_{SB}(g)|} \right\rceil$$

bits for each RRH g, where ⌈ ⌉ is a ceiling function.

6. The UE of claim 1, wherein:
the indicator is a two-stage indicator,
a first-stage indicator indicates a set of selected RRHs $S_{WB}$ in a wideband (WB) manner, for all SBs, and
a second-stage indicator indicates selected $|S_{SB}(g)|$ SBs for each RRH $g \in S_{WB}$.

7. The UE of claim 1, wherein:
the indicator is a two-stage indicator,
a first-stage indicator indicates a set of selected RRHs $S_{WB}$ in a wideband (WB) manner, for all SBs, and
a second-stage indicator indicates selected RRHs $S_{RRH}(k) \subset SWB$ for each SB k.

8. The UE of claim 1, wherein:
the CSI report includes a precoding matrix indicator (PMI) indicating spatial domain (SD) basis vectors, frequency domain (FD) basis vectors, and coefficients for (SD,FD) basis vector pairs, for a selected subset of SBs $S_{SB}(g)$ for a selected RRH g, and for SB k when $|S_{RRH}(k)|>1$, the CSI report further includes inter-RRH amplitude and phase components.

9. A base station (BS) comprising:
a processor configured to generate configuration information about a channel state information (CSI) report, the configuration information including a number of radio remote heads (RRHs), $N_{RRH}>1$; and
a transceiver operably coupled to the processor, the transceiver configured to:
  transmit the configuration information; and
  receive the CSI report including an indicator indicating a selected subset of RRHs for each subband (SB);
  wherein the subset of RRHs is selected from the $N_{RRH}$ RRHs independently for each subband (SB).

10. The BS of claim 9, wherein the indicator is based on RRH selection of $|S_{RRH}(k)|$ out of $N_{RRH}$ RRHs, for each SB k, and the CSI report is based on the selected $|S_{RRH}(k)|$ RRHs for each SB k.

11. The BS of claim 10, wherein:
the indicator is of length $N_{RRH}$ bits for each SB k, or the indicator is of length $$\left\lceil \log_2 \binom{N_{RRH}}{|S_{RRH}(k)|} \right\rceil$$

bits for each SB k, where $\lceil \ \rceil$ is a ceiling function.

12. The BS of claim 9, wherein the indicator indicates an SB selection of $|S_{SB}(g)|$ out of K SBs for each RRH g, and the CSI report is based on the selected $|S_{SB}(g)|$ SBs for each RRH g.

13. The BS of claim 12, wherein:
the indicator is of length K bits for each RRH g, or the indicator is of length $$\left\lceil \log_2 \binom{K}{|S_{SB}(g)|} \right\rceil$$

bits for each RRH g, where $\lceil \ \rceil$ is a ceiling function.

14. The BS of claim 9, wherein:
the indicator is a two-stage indicator,
a first-stage indicator indicates a set of selected RRHs $S_{WB}$ in a wideband (WB) manner, for all SBs, and
a second-stage indicator indicates selected $|S_{SB}(g)|$ SBs for each RRH $g \in S_{WB}$.

15. The BS of claim 9, wherein:
the indicator is a two-stage indicator,
a first-stage indicator indicates a set of selected RRHs $S_{WB}$ in a wideband (WB) manner, for all SBs, and
a second-stage indicator indicates selected RRHs $S_{RRH}(k) \subset S_{WB}$ for each SB k.

16. The BS of claim 9, wherein:
the CSI report includes a precoding matrix indicator (PMI) indicating spatial domain (SD) basis vectors, frequency domain (FD) basis vectors, and coefficients for (SD,FD) basis vector pairs, for a selected subset of SBs $S_{SB}(g)$ for a selected RRH g, and
for SB k when $|S_{RRH}(k)|>1$, the CSI report further includes inter-RRH amplitude and phase components.

17. A method for operating a user equipment (UE), the method comprising:
receiving configuration information about a channel state information (CSI) report, the configuration information including a number of radio remote heads (RRHs), $N_{RRH}>1$;
selecting a subset of RRHs from the $N_{RRH}$ RRHs independently for each subband (SB);
determining the CSI report including an indicator indicating the selected subset of RRHs for each SB; and
transmitting the CSI report including the indicator indicating the selected subset of RRHs for each SB.

18. The method of claim 17, further comprising:
determining the indicator based on RRH selection of $|S_{RRH}(k)|$ out of $N_{RRH}$ RRHs, for each SB k; and
determining the CSI report for the selected $|S_{RRH}(k)|$ RRHs for each SB k.

19. The method of claim 18, wherein:
the indicator is of length $N_{RRH}$ bits for each SB k, or the indicator is of length $$\left\lceil \log_2 \binom{N_{RRH}}{|S_{RRH}(k)|} \right\rceil$$

bits for each SB k, where $\lceil \ \rceil$ is a ceiling function.

20. The method of claim 17, wherein the indicator indicates an SB selection of $|S_{SB}(g)|$ out of K SBs for each RRH g, and
the method further comprises determining the CSI report for the selected $|S_{SB}(g)|$ SBs for each RRH g.

* * * * *